(12) United States Patent
Zhang et al.

(10) Patent No.: US 8,150,103 B2
(45) Date of Patent: Apr. 3, 2012

(54) BACKGROUND MODELING WITH FEATURE BLOCKS

(75) Inventors: Zhong Zhang, Herndon, VA (US); Alan J. Lipton, Herndon, VA (US); Peter L. Venetianer, McLean, VA (US); Weihong Yin, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 698 days.

(21) Appl. No.: 12/203,514

(22) Filed: Sep. 3, 2008

(65) Prior Publication Data

US 2009/0060277 A1  Mar. 5, 2009

Related U.S. Application Data

(60) Provisional application No. 60/935,859, filed on Sep. 4, 2007.

(51) Int. Cl.
- *G06K 9/00* (2006.01)
- *G06K 9/34* (2006.01)
- *G06K 9/46* (2006.01)

(52) U.S. Cl. .................. 382/103; 382/173; 382/195
(58) Field of Classification Search .................. 382/103, 382/195, 173
See application file for complete search history.

(56) References Cited

U.S. PATENT DOCUMENTS

| | | | |
|---|---|---|---|
| 2,212,025 A | 7/1989 | Lingenmann et al. | |
| 6,064,827 A | 5/2000 | Toyoda | |
| 6,104,831 A * | 8/2000 | Ruland | 382/173 |
| 6,424,370 B1 * | 7/2002 | Courtney | 348/143 |
| 6,493,041 B1 | 12/2002 | Hanko et al. | |
| 6,625,310 B2 | 9/2003 | Lipton et al. | |
| 6,696,945 B1 * | 2/2004 | Venetianer et al. | 340/541 |
| 6,954,225 B2 | 10/2005 | Chen | |
| 6,999,600 B2 * | 2/2006 | Venetianer et al. | 382/103 |
| 7,218,756 B2 | 5/2007 | Garoutte | |
| 7,574,019 B2 * | 8/2009 | Mittal et al. | 382/103 |
| 7,627,199 B2 * | 12/2009 | Sato et al. | 382/305 |
| 2004/0228530 A1 * | 11/2004 | Schwartz et al. | 382/173 |
| 2005/0146605 A1 * | 7/2005 | Lipton et al. | 348/143 |
| 2005/0179784 A1 * | 8/2005 | Qi | 348/208.1 |
| 2006/0170769 A1 * | 8/2006 | Zhou | 348/143 |
| 2006/0268111 A1 | 11/2006 | Zhang et al. | |
| 2006/0291695 A1 | 12/2006 | Lipton | |
| 2007/0127774 A1 | 6/2007 | Zhang et al. | |
| 2008/0107307 A1 * | 5/2008 | Altherr | 382/107 |
| 2008/0130952 A1 * | 6/2008 | Mittal et al. | 382/103 |

(Continued)

OTHER PUBLICATIONS

Matsuyama et al. "Background Subtraction for Non-Stationary Scenes" Proc. of Asian Confernce on Computer Vision, 2000, pp. 662-667.*

(Continued)

*Primary Examiner* — Stephen Koziol
*Assistant Examiner* — Utpal Shah
(74) *Attorney, Agent, or Firm* — Venable LLP; Jeffri A. Kaminski; Michael A. Sartori

(57) ABSTRACT

Video content analysis of a video may include: modeling a background of the video; detecting at least one target in a foreground of the video based on the feature blocks of the video; and tracking each target of the video. Modeling a background of the video may include: dividing each frame of the video into image blocks; determining features for each image block of each frame to obtain feature blocks for each frame; determining a feature block map for each frame based on the feature blocks of each frame; and determining a background feature block map to model the background of the vide based on at least one of the feature block maps.

16 Claims, 18 Drawing Sheets

U.S. PATENT DOCUMENTS

2008/0181453 A1*  7/2008  Xu et al. .................. 382/103
2008/0285859 A1* 11/2008  Lei et al. .................. 382/224
2010/0045799 A1*  2/2010  Lei et al. .................. 348/169

OTHER PUBLICATIONS

Zhang, J. and Chen, C.H., Moving objects detection and segmentation in dynamic video backgrounds, 2007 IEEE Conference on Technologies for Homeland Security, pp. 64-69, year={2007}.*

Collins R., et al. "Algorithms for Cooperative Multisensor Surveillance," Proceedings of the IEEE, vol. 89, No. 10, Oct. 2001, pp. 1456-1477.

Jin J.S., "A Stable Vision System for Moving Vehicles," IEEE Transactions on Intelligent Transportation Systems, vol. 1, No. 1, Mar. 2000, pp. 32-39.

International Search Report for International Application No. PCT/US08/075136 dated Nov. 18, 2008.

* cited by examiner

Strong-texture feature blocks

Weak-texture feature blocks

No-texture feature blocks

BACKGROUND MODELING WITH FEATURE BLOCKS

FIELD OF THE INVENTION

The invention relates to automatic video content analysis systems that may be configured with feature-based background modeling.

BACKGROUND OF THE INVENTION

The following patents and publications, the subject matter of each is being incorporated herein by reference in its entirety, are mentioned:

U.S. Pat. No. 6,999,600, issued Feb. 14, 2006, by Venetianer et al., entitled "Video Scene Background Maintenance Using Change Detection and Classification,"

U.S. Pat. No. 6,625,310, issued Jan. 17, 2006, by Lipton et al., entitled "Video Segmentation Using Statistical Pixel Modeling,"

U.S. Pat. No. 6,696,945, issued Feb. 24, 2004, by Venetianer et al., entitled "Video Tripwire,"

U.S. Published Patent Application No. 20060268111, filed May 31, 2005, by Zhang et al., entitled "Multi-State Target Tracking,"

U.S. Published Patent Application No. 20070127774, filed Jun. 7, 2007, by Zhang et al., entitled "Target Detection and Tracking from Video Stream,"

U.S. Published Patent Application No. 20050146605, filed Nov. 15, 2001, by Lipton et al., entitled "Surveillance System Employing Video Primitives,"

U.S. Pat. No. 6,064,827, issued May 16, 2000, by Yasuhiro Toyoda, entitled "Image Stabilizer,"

U.S. Patent Application No. 20050179784, filed Aug. 18, 2005, by Yingyong Qi, entitled "Adaptive Image Stabilization,"

R. Collins, A. Lipton, H. Fujiyoshi, and T. Kanade, "Algorithms for Cooperative Multisensor Surveillance," Proceedings of the IEEE, Vol. 89, No. 10, October, 2001, pp. 1456-1477, Jesse S. Jin, Zhigang Zhu, Guangyou Xu, "A Stable Vision System for Moving Vehicles", IEEE Transactions on Intelligent Transportation Systems, vol. 1, no. 1, March 2000, pp 32-39.

Video content analysis (VCA) may apply computer vision and artificial intelligence algorithms to video streams. Various applications for VCA include, for example, data retrieval and intelligent video surveillance (IVS). Recently, video surveillance have become more critical in many areas of life. One problem with video as a surveillance tool is that the video may be manually intensive to monitor. VCA algorithms may be applied to automate the video monitoring in the form of intelligent video surveillance systems. Such solutions are described, for example, in U.S. Pat. No. 6,696,945, U.S. Published Patent Application No. 20050146605, or U.S. Published Patent Application No. 20060268111, identified above.

One component in an IVS system may be referred to as background modeling, which may be used to differentiate between foreground and background, detect changes in the scene, and detect targets of interest. Pixel-based background modeling may be used in current video surveillance systems such as described, for example, in U.S. Pat. No. 6,999,600, U.S. Published U.S. Pat. No. 6,625,310, and R. Collins, A. Lipton, H. Fujiyoshi, and T. Kanade, "Algorithms for Cooperative Multisensor Surveillance," identified above. Pixel-based background modeling may use an individual image pixel as the base unit to model to the background scene. Pixel-based background modeling may be considered to be a widely used approach and may work well in many scenarios. However, pixel-based background modeling is far from perfection, especially compared with human perception in some less-friendly environments.

As one example, in a video content analysis system analyzing video from a static camera, a change detection module of the video content analysis system may employ pixel-based background modeling. Some camera-related video phenomena may significantly increase the difficulty of the change detection module to detect change in the video and may, in fact, reduce the overall system performance. Camera automatic gain control (AGC) and camera jitter, for example, may be two of the most common causes of these difficulties.

As to the first possibility, difficulties with change detection may arise from camera AGC. For instance, in video surveillance security applications, many surveillance cameras are fixed static cameras. To perform automatic video content analysis for these scenarios, the video content analysis system may usually assume that the background of the video is stable so that any fast changes in the video frames may be assumed to indicate moving targets, which are often the objects of interest. However, if anything triggers camera AGC, the video frames may include significant global intensity changes, including changes in the spatially stable background area. For example, in many video surveillance situations, the camera AGC may be triggered by large size moving targets appearing in the camera view whose image intensity is either much higher or much lower than the corresponding background area. Without detecting and accurately compensating these AGC effects, a VCA-based IVS system may likely introduce significant false target detections, where some background regions may be considered as foreground objects due to the fast intensity change caused by the camera AGC mechanism. One difficulty in such a system may be that given an image pixel whose intensity value changed from frame to frame, the system may need to determine whether this intensity change is caused by camera AGC or whether the pixel is part of a foreground moving object. However, current VCA-based IVS systems typically do not compensate for or consider this possibility.

As to the second possibility, difficulties with change detection may arise from camera jitter. Current image stabilization methods such as described, for example, in U.S. Pat. No. 6,064,827, U.S. Patent Application No. 20050179784, and Jesse S. Jin, Zhigang Zhu, Guangyou Xu, "A Stable Vision System for Moving Vehicles," identified above, may work on aligning consecutive video frames from a non-stationary camera to provide a steady view in an attempt to overcome camera jitter. In some applications, the camera jitter may be significant, for example, with handheld video cameras, but the requirement for the frame alignment accuracy may not be so critical. In other applications, however, the camera jitter may be significant and caused by wind or platform vibrations, and the requirement for the frame alignment accuracy may be critical. In these applications, the current stabilization techniques may fail when camera jitter occurs and when a large moving foreground object is in the camera view.

SUMMARY OF THE INVENTION

One embodiment of the invention may include a computer-implemented method for video content analysis of a video including: modeling a background of the video; detecting at least one target in a foreground of the video based on the feature blocks of the video; and tracking each target of the video. Modeling a background of the video may include: dividing each frame of the video into image blocks; determining features for each image block of each frame to obtain feature blocks for each frame; determining a feature block map for each frame based on the feature blocks of each frame;

and determining a background feature block map to model the background of the vide based on at least one of the feature block maps.

One embodiment of the invention may include a computer-implemented method for video content analysis of a video including: modeling a background of the video; detecting at least one target in a foreground of the video based on the feature blocks of the video; and tracking each target of the video. Modeling a background of the video may include: dividing each frame of the video into image blocks; determining features for each image block of each frame to obtain feature blocks for each frame; determining a feature block map for each frame based on the feature blocks of each frame; determining a reference feature block map based on the feature blocks of frames of the video; determining jitter for each frame based on the reference feature block map and the feature block map of the frame; and adjusting each frame based on the determined jitter.

One embodiment of the invention may include a computer-implemented method for video content analysis of a video including: determining feature blocks for a video; determining a background model of the video based on the feature block maps; detecting at least one target in a foreground of the video based on the feature blocks of the video; tracking each target of the video. Determining feature blocks for a video may include: dividing each frame of the video into image blocks; determining features for each image block of each frame to obtain feature blocks for each frame; and determining a feature block map for each frame based on the feature blocks of each frame. Detecting at least one target in a foreground of the video based on the feature blocks of the video may include: identifying feature blocks of each frame that are likely background in the video as high-confident background feature blocks; determining whether each frame has a video camera automatic gain control effect based on the high-confident background feature blocks; and compensating for the video camera automatic gain control effect in each frame by adjusting the background model based on the high-confident background feature blocks.

BRIEF DESCRIPTION OF THE DRAWINGS

The foregoing and other features and advantages of the invention will be apparent from the following, more particular description of the embodiments of the invention, as illustrated in the accompanying drawings.

DEFINITIONS

Figure 1:
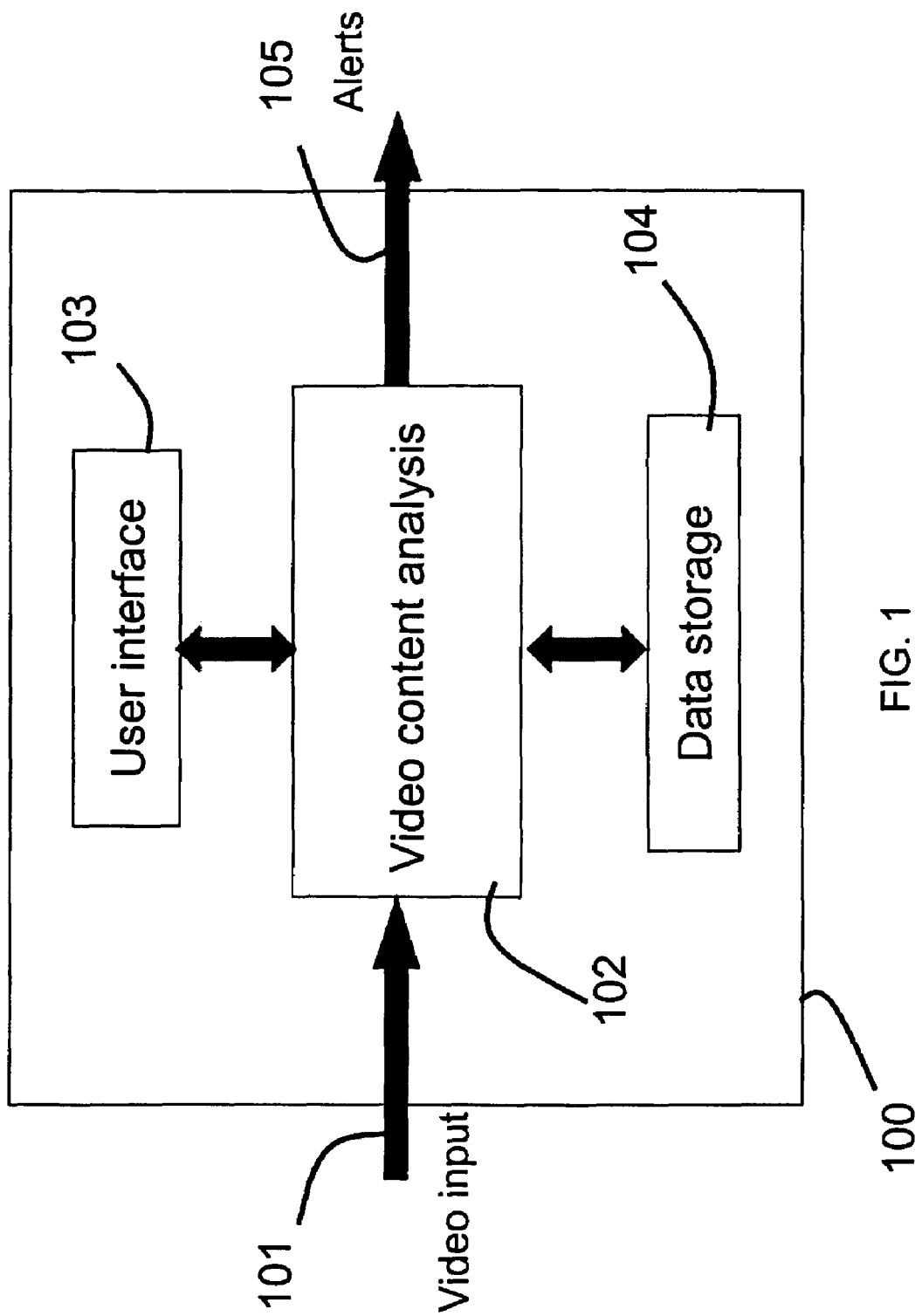
FIG. 1 illustrates an exemplary video surveillance system according to an exemplary embodiment of the invention.

In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" may refer to some or all of a video.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

An "object" may refer to an item of interest in a video. Examples of an object include: a person, a vehicle, an animal, and a physical subject.

A "target" may refer to a computer model of an object.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EXEMPLARY EMBODIMENTS

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose.

With the invention, a feature-based background modeling scheme may be used with pixel-based background modeling as part of a VCA system. Compared to the existing pixel-based background modeling schemes, the inventive feature-based approach may be more robust and more computationally efficient. In addition, feature-based background modeling may provide rich information to help detect and handle some camera related video artifacts such as, for example, camera AGC effects and camera jitter effects.

With the invention, the foreground and background segmentation process may be integrated with the global image intensity change detection and compensation process, which may be able to achieve good performance on foreground and background segmentation and AGC detection and compensation.

With the invention, an image stabilization algorithm may be provided to compensate for camera jitter. With the invention, faster than real-time operation with sub-pixel accuracy may be achieved for different background scenarios, such as, for example, when a significant amount of moving foreground objects appear in the camera view.

With the invention, global intensity change compensation and frame stabilization may be integrated in a whole-image feature-based VCA system. The invention may be distinguished from the conventional approaches by integrating the three functions of segmentation, stabilization, and AGC compensation via a single background model. With the invention, for example, for each video frame, the inventive system may maintain a feature background model and may classify the frame region into foreground region and background region with different confidence levels and texture properties. To estimate camera AGC, a low or no texture high confident background region may be used. To estimate camera jitter, a high confident background region with stable texture feature may be used. By employing the inventive high confident feature selective approach, the inventive system may be able to achieve more accurate and efficient performance than existing schemes.

The invention may be used in a video surveillance system to improve the performance of the system. The majority of the conventional VCA-based IVS systems assume a stationary video camera and stable illumination conditions. Any violations of these two assumptions may likely cause severe performance degradation of the VCA system. The invention may provide techniques to mitigate the impact of the violating these two assumptions in an accurate and efficient manner.

FIG. 1 depicts an exemplary conceptual block diagram of a VCA-based IVS system 100 according to embodiments of the invention. The video input 101 may provide video from, for example, a normal closed-circuit television (CCTV), other video camera, or other source internal or external to the system 100. Video content analysis module 102, which may be, in some embodiments of the invention, embodied as a computer, may perform scene content analysis. A user may set up the system and define events of interest through a user interface 103. Once any such event is detected, alerts 105 may be output by the video content analysis module 102, may be sent to specific people and/or device(s), and may contain necessary information and/or instructions for further attention and investigation. Data storage 104 may store, for example, video data, scene context data, and/or other event related data to be used, for example, in later forensic analysis.

Figure 2:
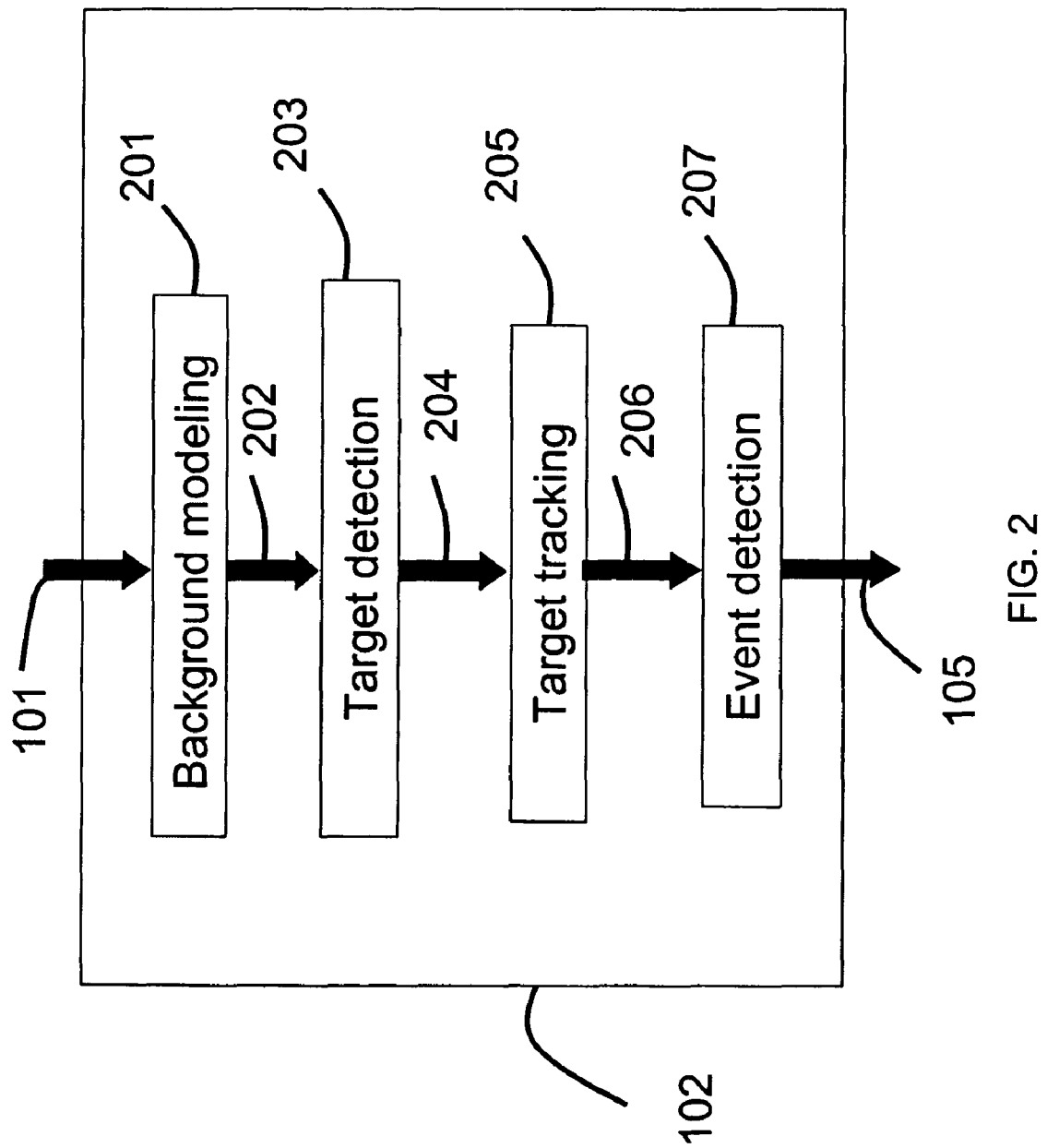
FIG. 2 depicts an exemplary conceptual block diagram of a content analysis module, according to embodiments of the invention.

FIG. 2 depicts an exemplary conceptual block diagram for the video content analysis module 102, according to embodiments of the invention. A background modeling module 201 may separate foreground from background in the video input 101, and the output 202 of this module may include, for example, a set of image masks indicating foreground and background regions for each frame. A target detection module 203 may group foreground regions into potential separate target blobs 204. These blobs 204 may correspond to observations of a target at each timestamp (where, for example, a particular timestamp may be associated with a frame of the video). A target tracking module 205 may create and track each target in the video via the blobs 204, where such a target may correspond to a spatio-temproal object an object in the scene over a number of frames. The tracking module 205 may provide a representation of a real object 206. Using any representation of real objects 206, an event detection module 207 may perform event detection based on user-defined rules. The detection of an event by the event detection module 207 may trigger the output of an alert 105.

Figure 3:
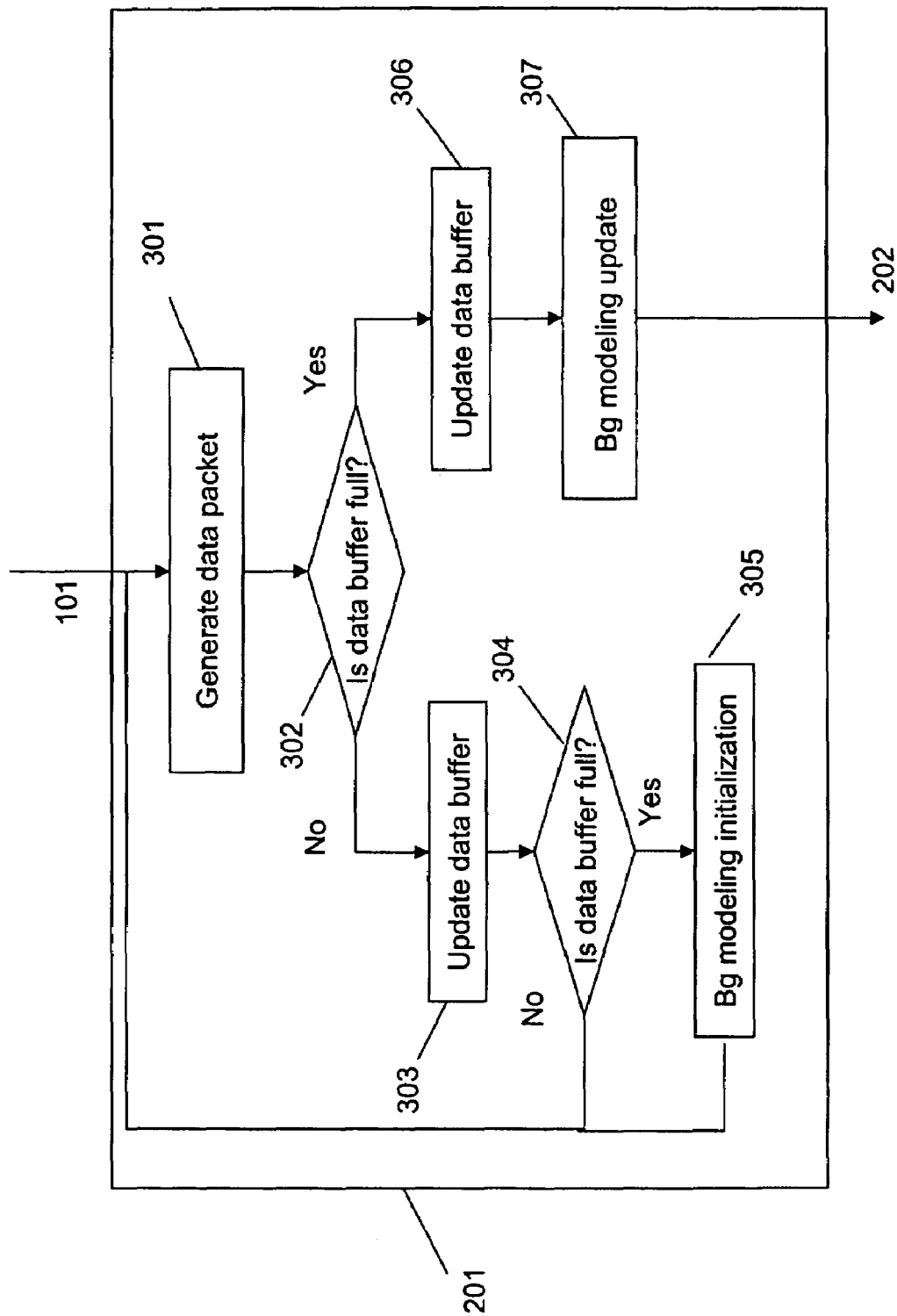
FIG. 3 depicts an exemplary conceptual block diagram of a background modeling module, according to embodiments of the invention.

FIG. 3 depicts an exemplary conceptual block diagram of the background modeling module 201, according to embodiments of the invention. Block 301 may generate a data packet for each video frame of the input video 101. The generated data packet may include, for example, the original video frame, the stabilized video frame, the estimated camera jitter parameters for the frame, and/or the extracted block feature map for the frame. The data packet may contain information regarding processing of the video. Block 301 is discussed further below with reference to FIG. 4. The generated data packet may be stored in an data buffer of the VCA module 102. The data buffer may be maintained, for example, to perform temporal analysis of the input video 101. The data buffer, for example, may be a time-indexed queue structure. The time length of the data buffer may be controlled by a default parameter, for example, 2 seconds, and/or by a user input parameter. Block 302 may determine whether the data buffer is full. If the data buffer is not full, flow may proceed to block 303; otherwise, flow may proceed to block 306. Before the data buffer is full, block 303 may add the new data packet to the end of the data buffer. Like block 302, block 304 may determine whether the data buffer is full. If the data buffer is not full, flow may proceed to block 301; otherwise, flow may proceed to block 305. When the data buffer becomes full for the first time, block 305 may initialize the background model. For example, block 305 may perform an initialization process to determine a reference video frame for camera jitter estimation and may create the initial background model. To the extent a reference frame may be needed to determine the information for the data packet, the first frame to be processed may be considered a reference frame, until the background model is initialized in block 305. After background modeling initialization is complete, flow may proceed back to block 301. Block 306 may update the data buffer by, for example, replacing the oldest existing data packet in the data buffer with the new data packet. Block 307 may update the background model by, for example, updating the data structure described with reference to FIG. 9.

Figure 4:
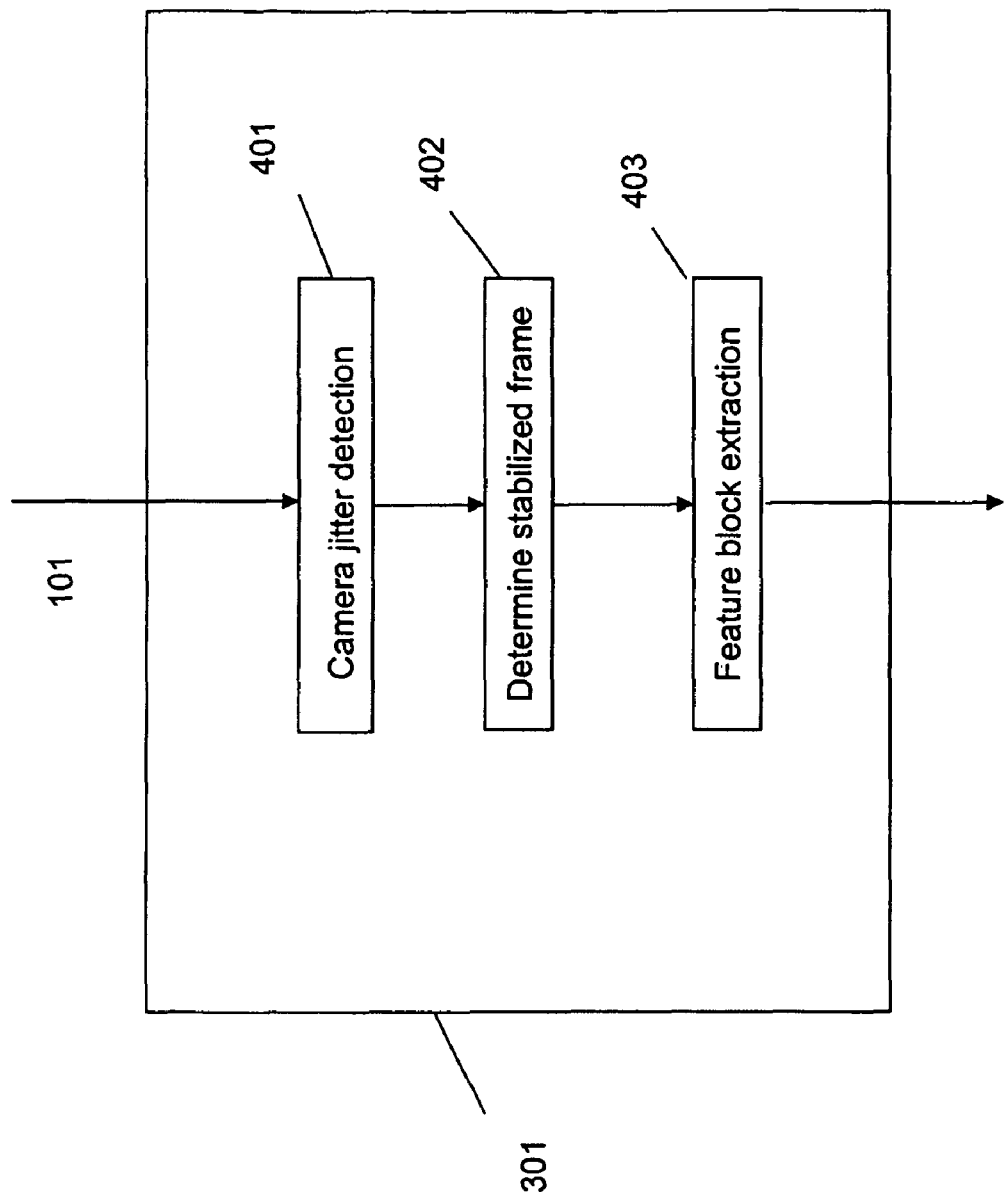
FIG. 4 depicts an exemplary conceptual block diagram of a data packet generating module, according to embodiments of the invention.

FIG. 4 depicts an exemplary conceptual block diagram for data packet generation in block 301, according to embodiments of the invention. Block 401 may detect camera jitter by, for example, estimating the image displacement of the input frame compared to the reference frame. Block 401 is discussed further below with reference to FIG. 10. Block 402 may determine a stabilized frame based, for example, on the camera jitter detected from block 401. The original frame may be shifted based on the amount of camera jitter detected. Linear interpolation may be used if the shift is not an integer number. Block 403 may extract features for each image block of the stabilized frame and create a feature block map for each stabilized video frame. Block 403 and feature block maps are discussed further below with reference to FIGS. 5-7. The estimated camera jitter parameters from block 401, the stabi-lized frame from block 402, and the feature block map from block 403 may become part of the data packet that is generated with block 301.

Figure 5:
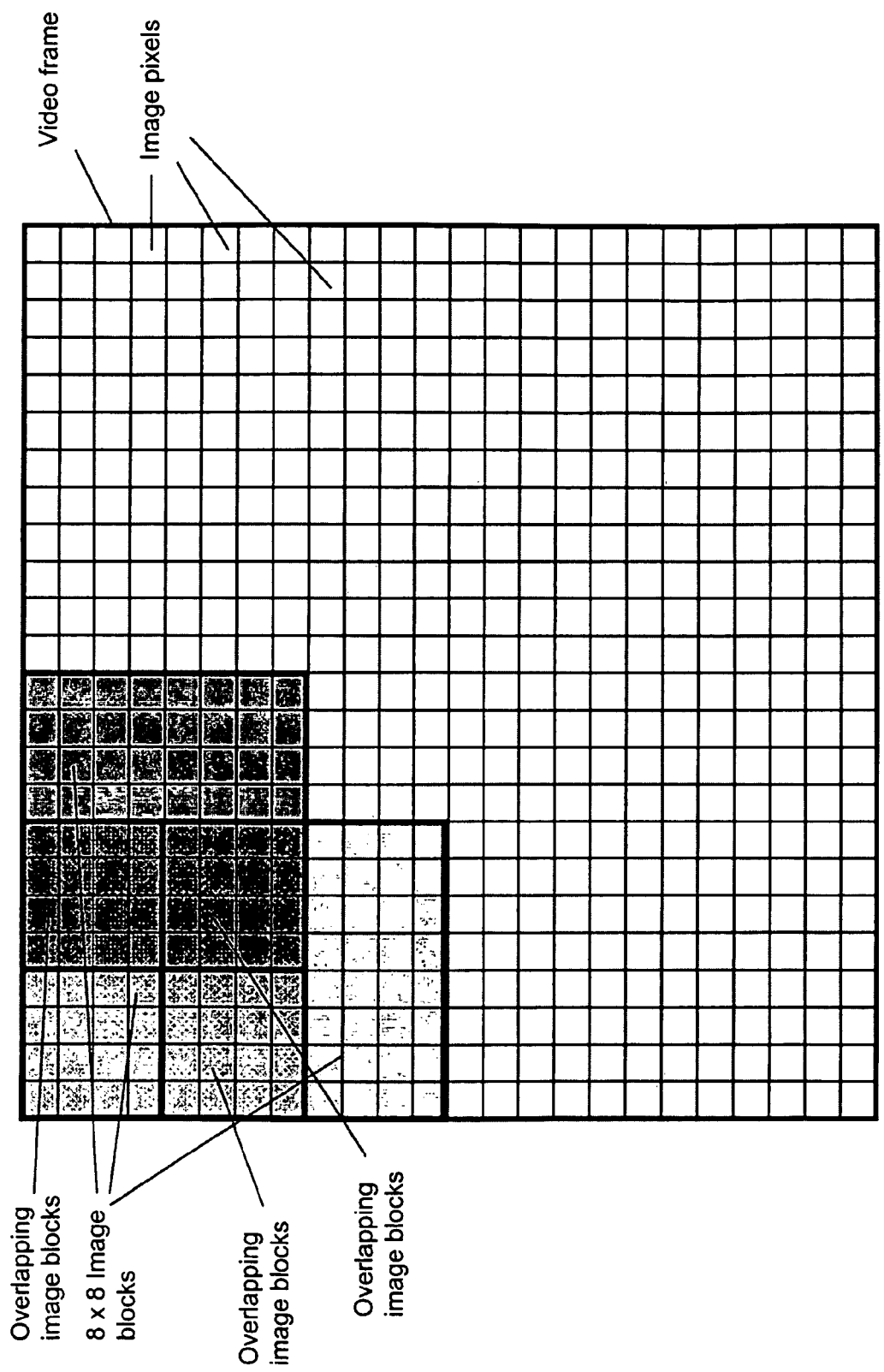
FIG. 5 illustrates on how to divide a video frame into image blocks and obtain an image block map, according to embodiments of the invention.

FIG. 5 illustrates an exemplary technique to divide a video frame into image blocks and obtain an image block map, according to embodiments of the invention. Each video frame may be divided into image blocks, and an image block map for each video frame may be generated based on the image blocks. The exemplary video frame in FIG. 5 is 24×24 pixels in size and may be divided into multiple 8×8 image blocks. To capture the features at the edges of the image blocks, each two neighboring blocks may be overlapped by, for example, 50% as illustrated in FIG. 5. Image blocks may not be overlapped or may be overlapped by more or less than 50%, as will be recognized by those of ordinary skill in the art. For the example here, for an input video with frame width $W_F$ and frame height $H_F$, the corresponding image block map width $W_M$ and image block map height $H_M$ may be computed as follows: $W_M=W_F/4-1$; and $H_M=H_F/4-1$. An image block map may be said to be of size $W_M \times H_M$. For this example, the image block map for FIG. 5 may be of size 5×5.

With the image block map generated as described with reference to FIG. 5, features may be extracted for each image block in the image block map for each video frame. Once features are extracted for an image block for a video frame, a feature block may be generated corresponding to the respective image block of the video frame. Once feature blocks are generated for each respective image block of the image block map for a video frame, a feature block map may be generated for the video frame and may be comprised of the respective feature blocks of the video frame.

Figure 6B:
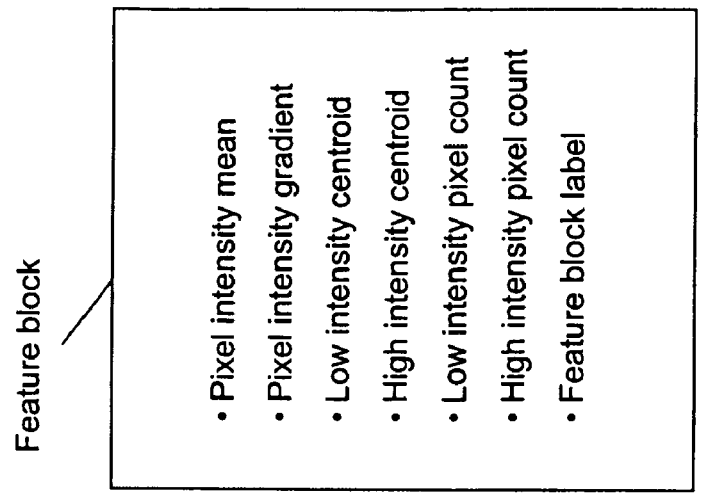
FIG. 6 illustrates a block data structure for an intensity image, according to embodiments of the invention.
Figure 6A:
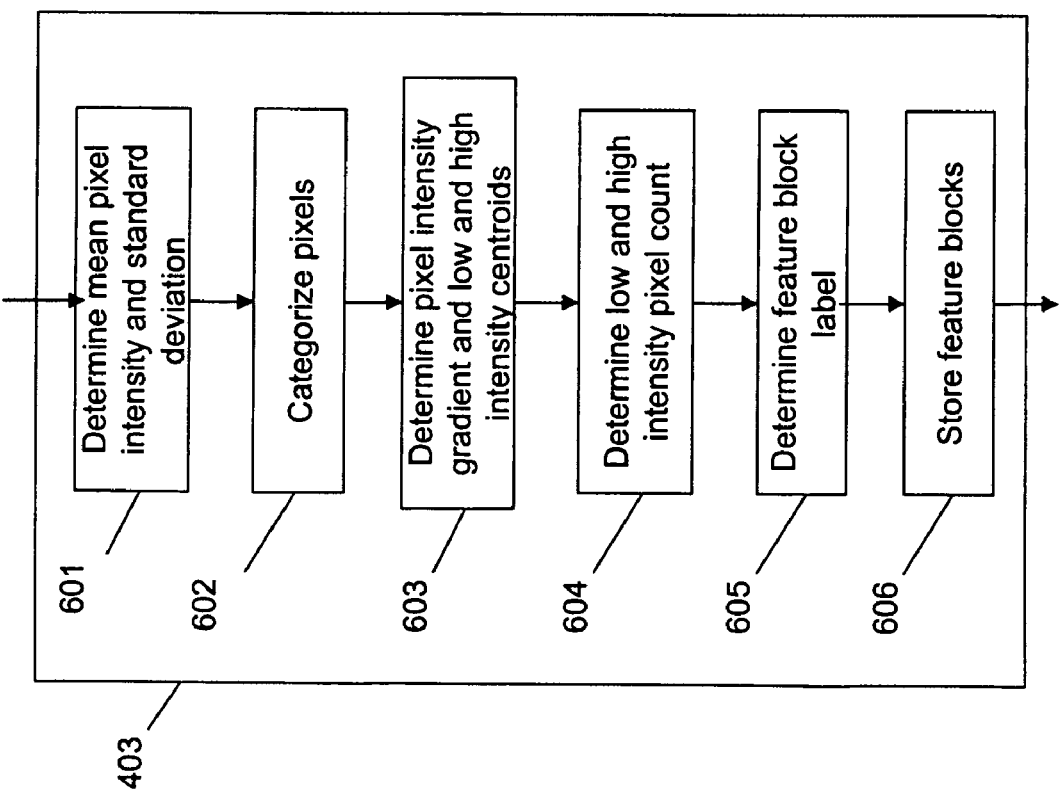

FIG. 6A depicts an exemplary conceptual block diagram for generating data for a feature block, according to embodiments of the invention, and FIG. 6B illustrates a data structure for a feature block, according to embodiments of the invention. For a gray scale video frame, the video frame may have one feature block map, and for a color video frame, each color band may have a respective feature block map. Referring to FIG. 6B, block 601 may determine the mean and standard deviation of the pixel intensities for each image block within the current video frame.

Block 602 may categorize the pixels in each image block into three types: high intensity pixel, low intensity pixel and medium intensity pixel. The mean and standard deviation determined in block 601 may be used to generate two thresholds for this purpose. For example, the high threshold may be the mean plus the standard deviation, and the low threshold may be the mean minus the standard deviation. Pixels having intensities greater than the high threshold may be categorized as high intensity pixels, having intensities less than the low threshold may be categorized as low intensity pixels, and having intensities between the high and low thresholds may be categorized as medium intensity pixels. Other categorizations of pixels will become apparent to those of ordinary skill in the art.

Block 603 may determine the pixel intensity gradient and the high and low intensity centroids for each image block. The pixel intensity gradient for each image block may be determined using conventional techniques. The high intensity centroid may determined for the high intensity pixels from block 602 using conventional techniques for determining a centroid for a set of pixels. The low intensity centroid may determined for the low intensity pixels from block 602 using conventional techniques for determining a centroid for a set of pixels.

Block 604 may determine a high intensity pixel count and a low intensity pixel count for the feature block. The high intensity pixel count may refer to the number of pixels in an image block that are categorized as high intensity pixels, and the low intensity pixel count may refer to the number of pixels in an image block that are categorized as low intensity pixels.

Block 605 may determine the feature block labels. For example, based on the texture property of each image block, each feature block may be classified into three types and labeled accordingly: strong-texture feature block, weak-texture feature block and no-texture feature block. The strong-texture feature block label may refer to those feature blocks with a large pixel intensity gradient, a large high intensity pixel count, and a large low intensity pixel count. The no-texture feature block label may refer to those feature blocks with very low intensity gradient. The weak-texture feature block label may refer to those feature blocks that are labeled with neither a strong-texture feature block label nor a no-texture feature block label. Other labels for the feature blocks will become apparent to those of ordinary skill in the art.

Block 606 may determine a feature block based on the data determined in blocks 601-605 for each image block for the current frame and stores the feature bocks according to the data structure in FIG. 6B. The combined features blocks for the current frame may constitute the feature block map for the current frame. As discussed above for block 301, the feature block maps may be used to populate the data packet for the current frame. Other data may be stored for each feature block, as will become apparent to those of ordinary skill in the art.

Figure 7C:
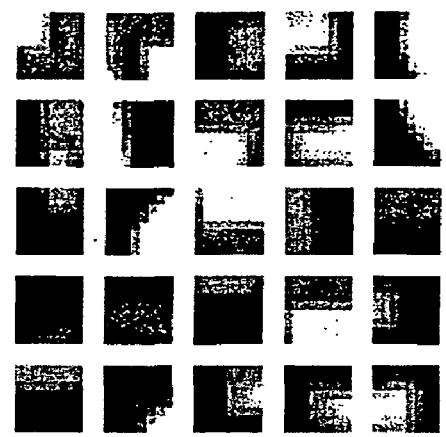
FIG. 7 shows examples of three types of feature blocks, according to an exemplary embodiment of the invention.
Figure 7B:
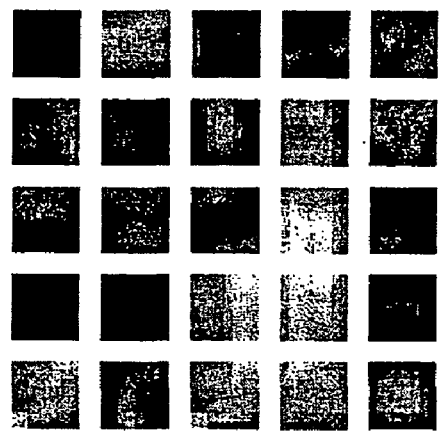
Figure 7A:

FIGS. 7A, 7B, and 7C show examples of the three types of exemplary feature blocks. FIG. 7A depicts samples for no-texture feature blocks. FIG. 7B depicts samples for weak-texture feature blocks. FIG. 7C depicts samples for strong-texture feature blocks.

Figure 8:
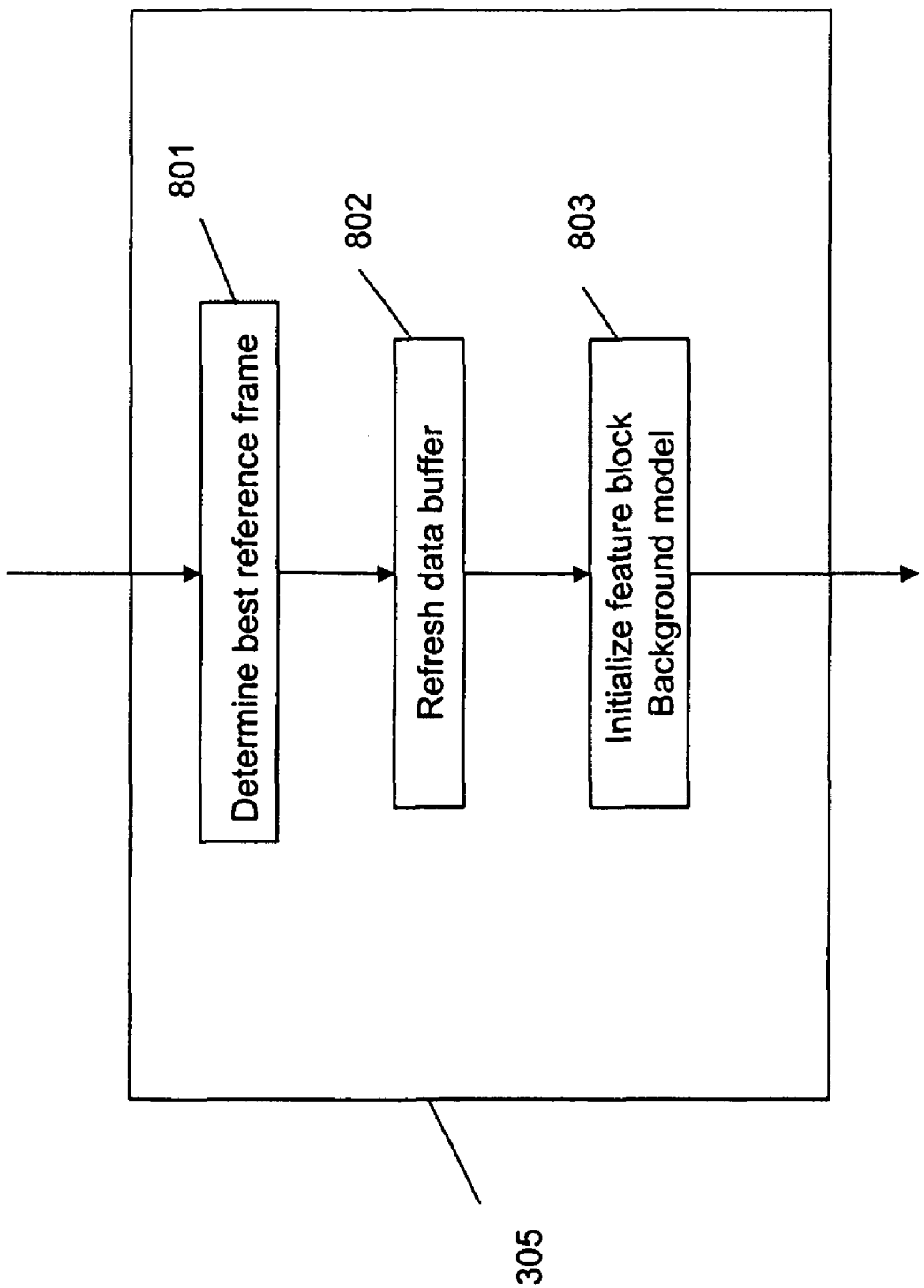
FIG. 8 depicts an exemplary conceptual block diagram of a background modeling initialization module, according to embodiments of the invention.

FIG. 8 depicts an exemplary conceptual block diagram of the background modeling initialization in block 305, according to embodiments of the invention. Block 801 may determine the best reference frame based on the data packets for the video frames in the data buffer. For the N data packets in the data buffer, the N−1 pairs of neighboring block feature maps ($P_k$ and $P_{K+1}$, k=1, 2, . . . , N−1) may be examined to determine which pair has the most matched strong-texture feature blocks. Two feature blocks may be considered to match if they correspond to the same image block and if they both are labeled as strong-texture feature blocks and have very similar high and low intensity centroids. The number of matched feature blocks for each feature map pair may be denoted as $M_k$ (k=1, 2, . . . , N−1). The best reference frame $F_k$ may be selected so that ($M_{k-1}+M_k$) is the maximum for all the frames in the data buffer. After the reference frame is selected, block 802 may refresh the data buffer by performing block 301 on the remaining frames in the data buffer so that all the frames and feature maps are spatially aligned. Using the refreshed data buffer, block 803 may initialize the feature block background model which may include three components as illustrated in FIG. 9.

Figure 9:
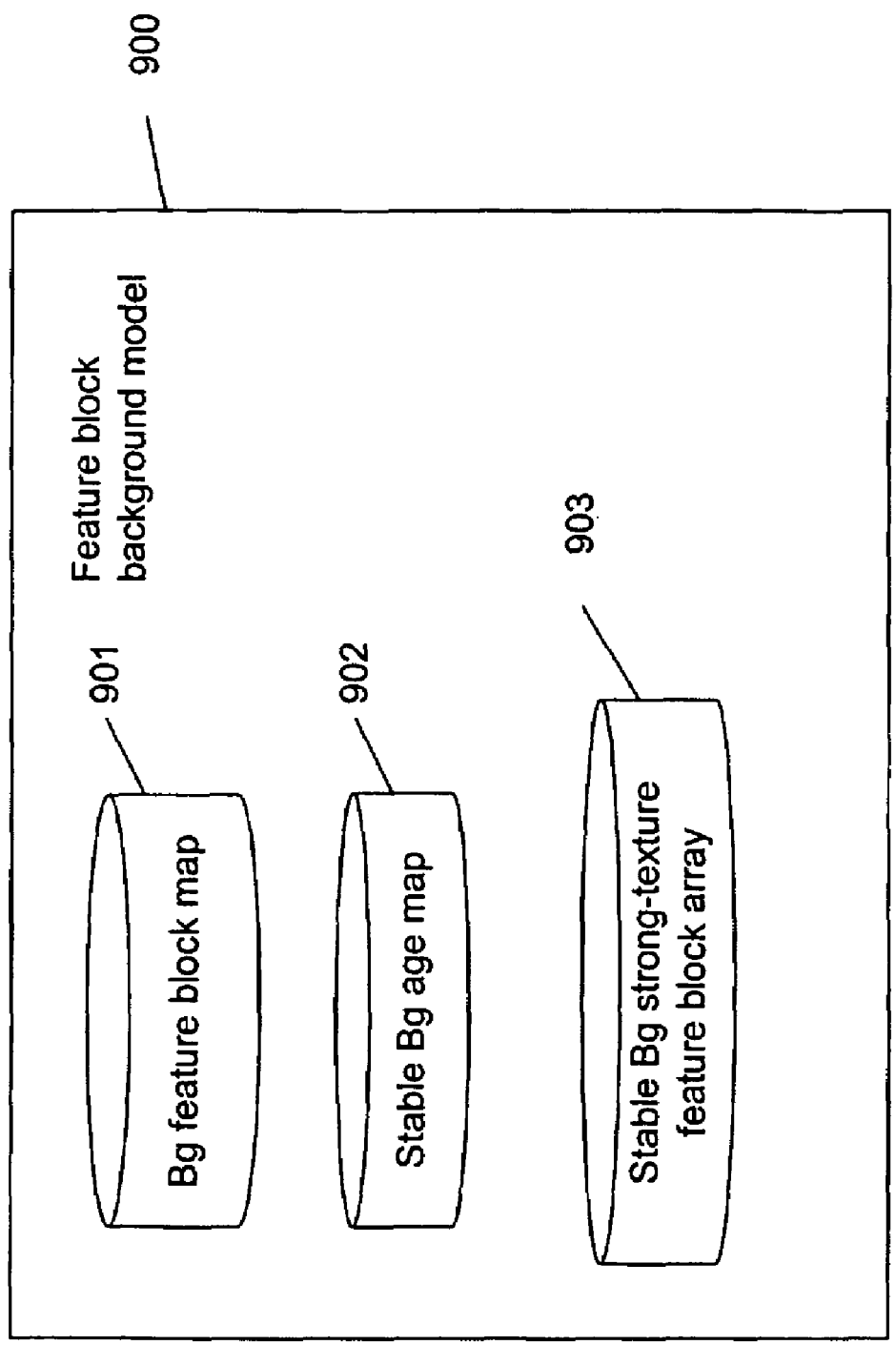
FIG. 9 demonstrates a data structure for a feature block background model, according to embodiments of the invention.

FIG. 9 demonstrates a data structure for a feature block background model 900, according to embodiments of the invention. Block 901 may be a feature block background map, which may initially be the best reference frame $F_k$ from block 803. Block 902 may be a stable background age map which may maintain the age of each feature block in the feature block background map. Block 903 may be a stable background feature block array which may indicate the features blocks in the feature block map that have the same block label (e.g., strong-texture feature block label) for a certain period of time.

Figure 10:
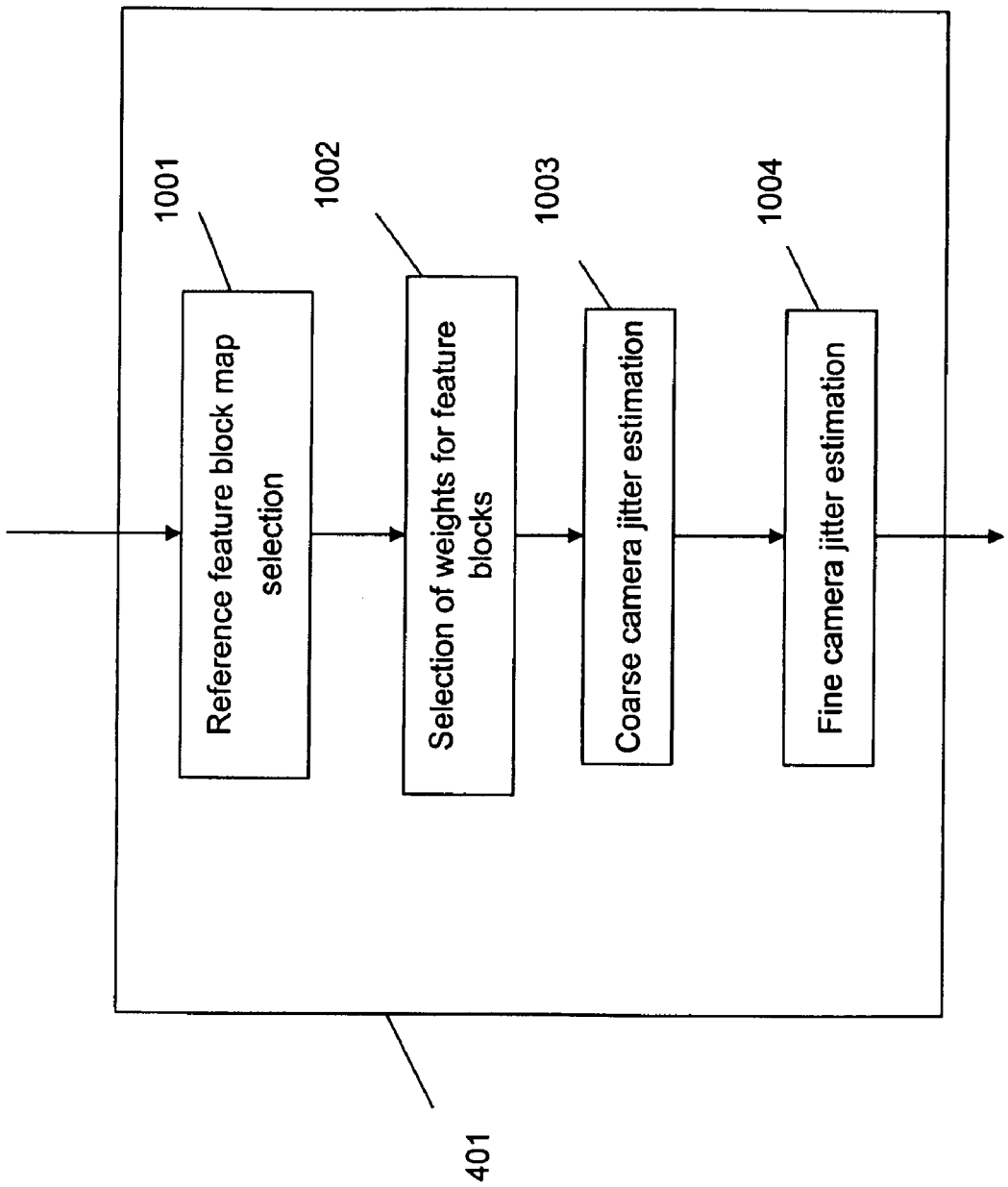
FIG. 10 depicts an exemplary conceptual block diagram of a camera jitter detection module, according to embodiments of the invention.

FIG. 10 depicts an exemplary conceptual block diagram for the camera jitter detection of block 401, according to embodiments of the invention. To estimate the camera jitter on a given video frame, a reference feature block map and strong-texture feature blocks may be used to determine the misalignment. Block 1001 may select the reference feature block map based on the current state of the IVS system. For example, the reference feature block map may be determined from the stable background feature block array of block 903.

Block 1002 may select weights for the feature blocks in the reference feature block map. Stable strong-feature texture feature blocks may be given higher weight than less stable strong-feature texture feature blocks or weak-feature texture feature blocks. The feature blocks at different parts of the frame may have a similar weight when determining the amount of camera jitter, or the video frame may be equally divided (for example, into four regions: top left, top right, bottom left and bottom right) and given equal weighting to each region. The number of strong-texture feature blocks may be counted for each region. The weight for each region may be determined by the sum of the weights of each of the feature blocks. The feature blocks for any region may be randomly sub-sampled if the number of strong-texture feature blocks for the region is significantly larger than that of other regions. This ensures that the camera jitter detection may not be biased by a dense cluster of features in a particular area of a frame. When regions are randomly sub-sampled, the weight for each region may be determined by the sum of the weights of the feature blocks in the region. The weights for the feature blocks in the reference feature block map may be used to ensure a good spatial distribution of usable features and/or for further processing of the video.

Block 1003 may perform coarse camera jitter estimation using, for example, a deterministic approach. Block 1003 is discussed further below with reference to FIG. 11.

Block 1004 may perform fine camera jitter estimation. A local search for the optimal camera jitter parameters may be performed, and the final estimation of camera jitter parameters with sub-pixel accuracy may be determined.

Block 1004 is discussed further below with reference to FIG. 12. Here, the exemplary embodiment focused on camera jitter detection for IVS using a stationary camera, where the major frame-to-frame misalignment is due to video frame shift. However, the invention may be applied to more general camera motion cases as well.

Figure 11:
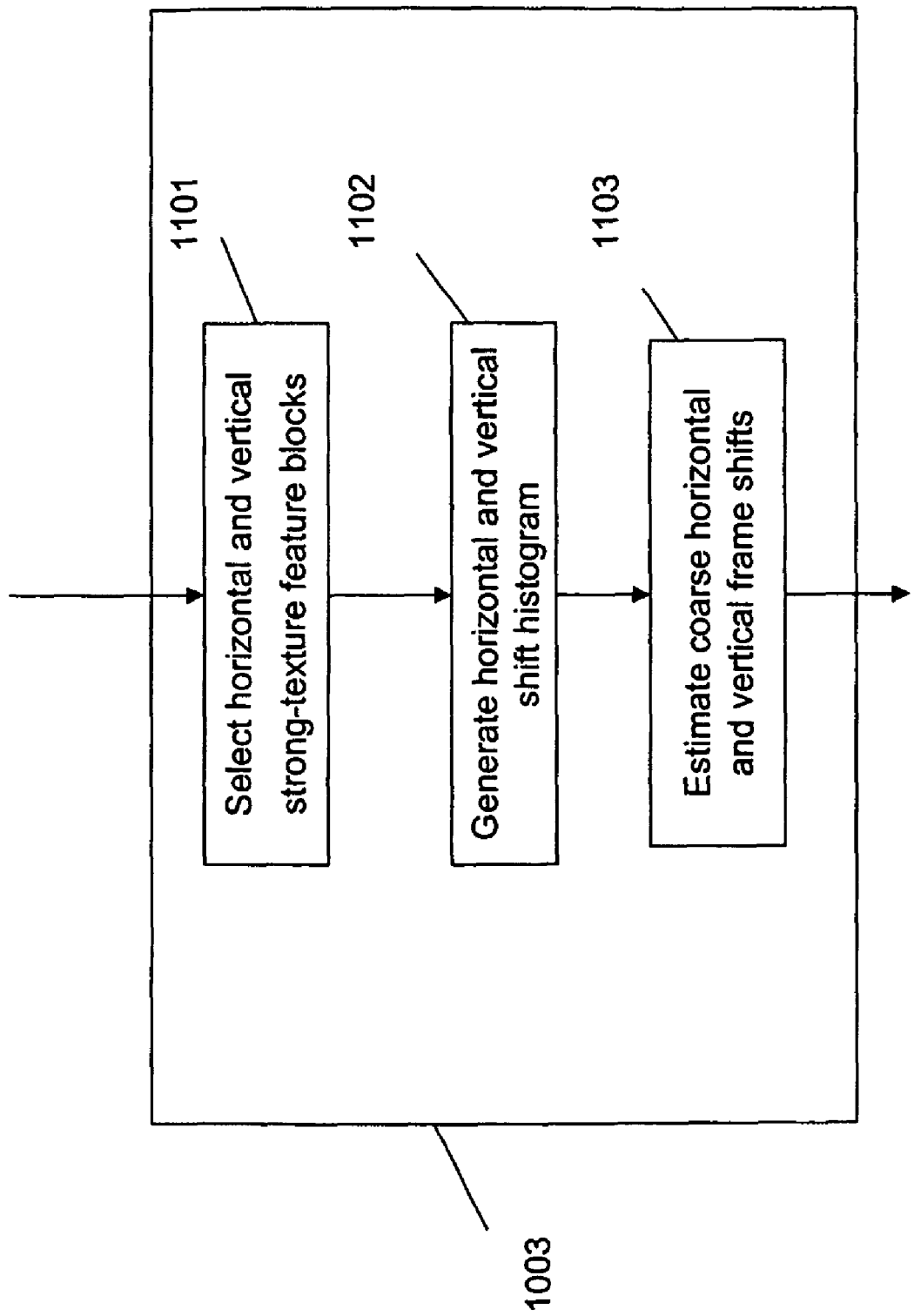
FIG. 11 depicts an exemplary conceptual block diagram of a coarse camera jitter estimation module, according to embodiments of the invention.

FIG. 11 depicts an exemplary conceptual block diagram for the coarse camera jitter estimation of block 1003, according to embodiments of the invention. Block 1101 may select horizontal strong-texture feature blocks and vertical strong-texture feature blocks from the reference feature block map determined in block 1001. A horizontal strong-texture feature block may refer to a strong-texture feature block having a pixel intensity gradient (see FIG. 6B) predominantly in the horizontal direction, and a vertical strong-texture feature block may refer to a strong-texture feature block having a pixel intensity gradient (see FIG. 6B) predominantly in the vertical direction. A direction range threshold may be set to determine whether a strong-texture feature block is a horizontal one or a vertical one. The direction range threshold may vary depending on the amount of feature blocks available. For example, if a pixel intensity gradient having a gradient direction of 0 degrees represents horizontal and if the direction range threshold is Rd, any strong-texture feature block with a gradient angle within the range of −Rd/2 to Rd/2 may be considered to be a horizontal strong-texture feature block. The direction range threshold Rd may be increased if there are not enough horizontal feature blocks available. The maximum value of the threshold Rd may be 90 degrees. So, with the direction range threshold, the strong-texture feature blocks of the reference feature block map are determined to be either horizontal strong-texture feature blocks and/or vertical strong-texture feature blocks.

Block 1102 may generate a horizontal shift graph and a vertical shift graph using the horizontal strong-texture feature blocks and the vertical strong-texture feature blocks, respectively, from block 1101. For each horizontal strong-texture feature block of the reference feature block map, the input frame may be searched only horizontally to find the best matching feature block. Similarly, for each vertical strong-texture feature block of the reference feature block map, the input frame may be searched only vertically to find the best matching feature block. The matching measure may be the average distance between the corresponding low and high intensity centroids (see FIG. 6B) of the feature block from the reference feature block map and the feature block from the input frame. Other matching measures may be used. The difference in horizontal pixel locations between the horizontal location for each horizontal strong-texture feature block and its matched feature block from the input frame may be determined. The horizontal shift graph may be determined from these horizontal shifts. Similarly, the difference in vertical pixel locations between the vertical location for each vertical strong-texture feature block and its matched feature block from the input frame may be determined. The vertical shift graph may be determined from these vertical shifts. The horizontal shift graph may be a horizontal shift histogram, and the vertical shift graph may be a vertical shift graph histogram. If only integer shifts are considered, the indices of the graphs may be bounded by a maximum search range.

Block 1103 may estimate the coarse horizontal frame shifts and the coarse vertical frame shift by, for example, finding the peaks of the horizontal shift graph and the vertical shift graph, respectively. The coarse horizontal and vertical frame shifts may be considered to correspond to coarse camera jitter parameters for the horizontal and vertical directions, respectively.

As an option, in block 1102, while performing the search for the matching feature blocks, an integral image may be used to generate the feature blocks for the input frame to reduce the computing cost. Further, the two jitter parameters may be estimated independently in blocks 1101-1103, and the matching measure may be easier to determine. Consequently, block 1003 may be much more computationally efficient compared to the conventional exhaustive search methods or the conventional random sample consensus (RANSAC) based feature matching methods to determine jitter parameters.

Figure 12:
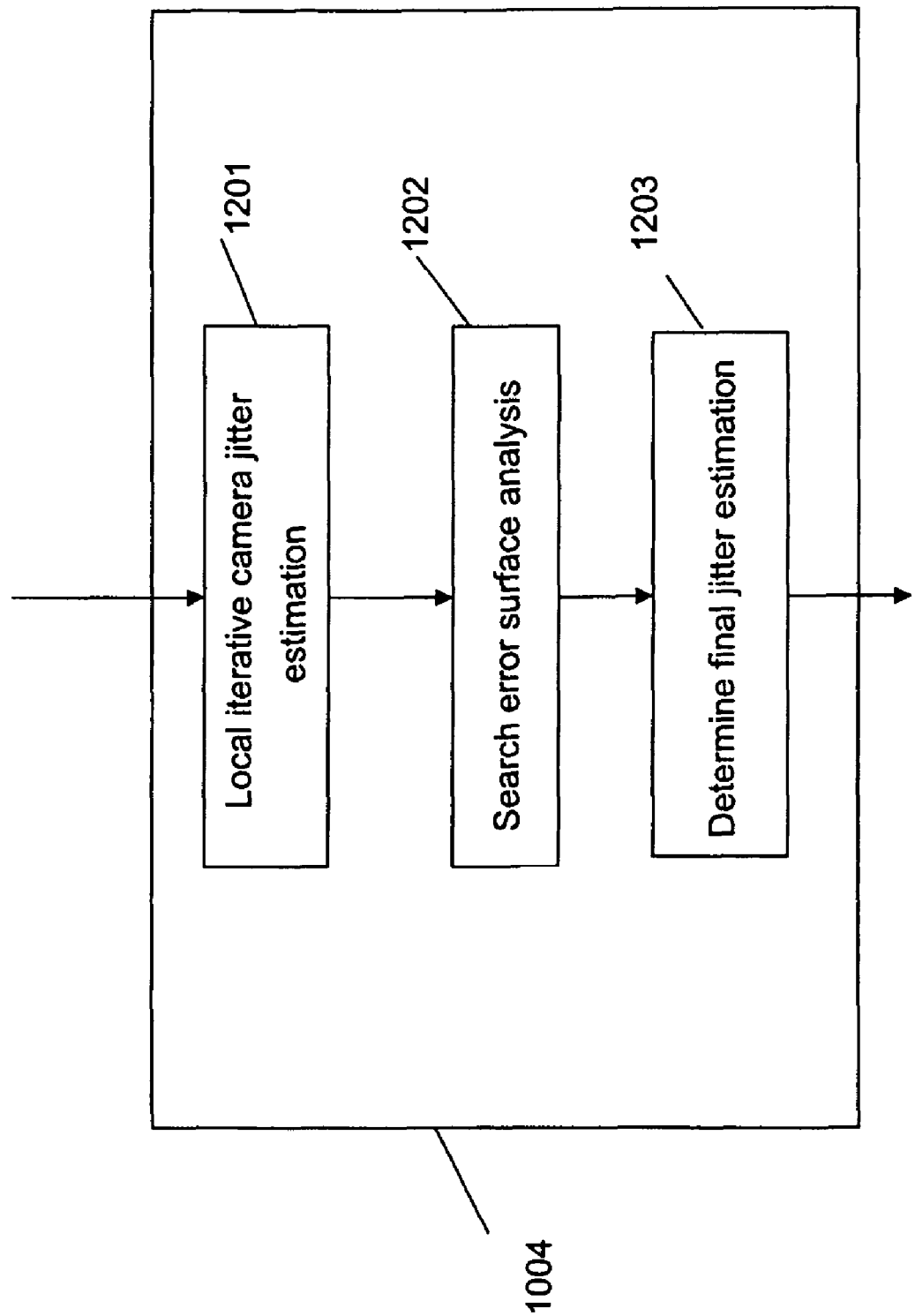
FIG. 12 depicts an exemplary conceptual block diagram of a local fine-scale camera jitter estimation module, according to embodiments of the invention.

FIG. 12 depicts an exemplary conceptual block diagram for the fine camera jitter estimation of block 1004, according to embodiments of the invention. Block 1201 may estimate local iterative camera jitter. The iterative search may search the eight directions from the coarse estimation result from block 1003. A match error may be determined for each direction using, for example, the sum of absolute differences (SAD) approach, intensity correlation, or some other standard technique. For each direction, the search may end when the match error increases. After searching all eight directions, block 1202 may perform search error surface analysis to locate the minimum of the surface in terms of four neighboring pixel locations. Block 1203 may determine the final jitter estimation using the four minima from block 1202 and the corresponding fitting errors by second degree polynomial fit.

Figure 13:
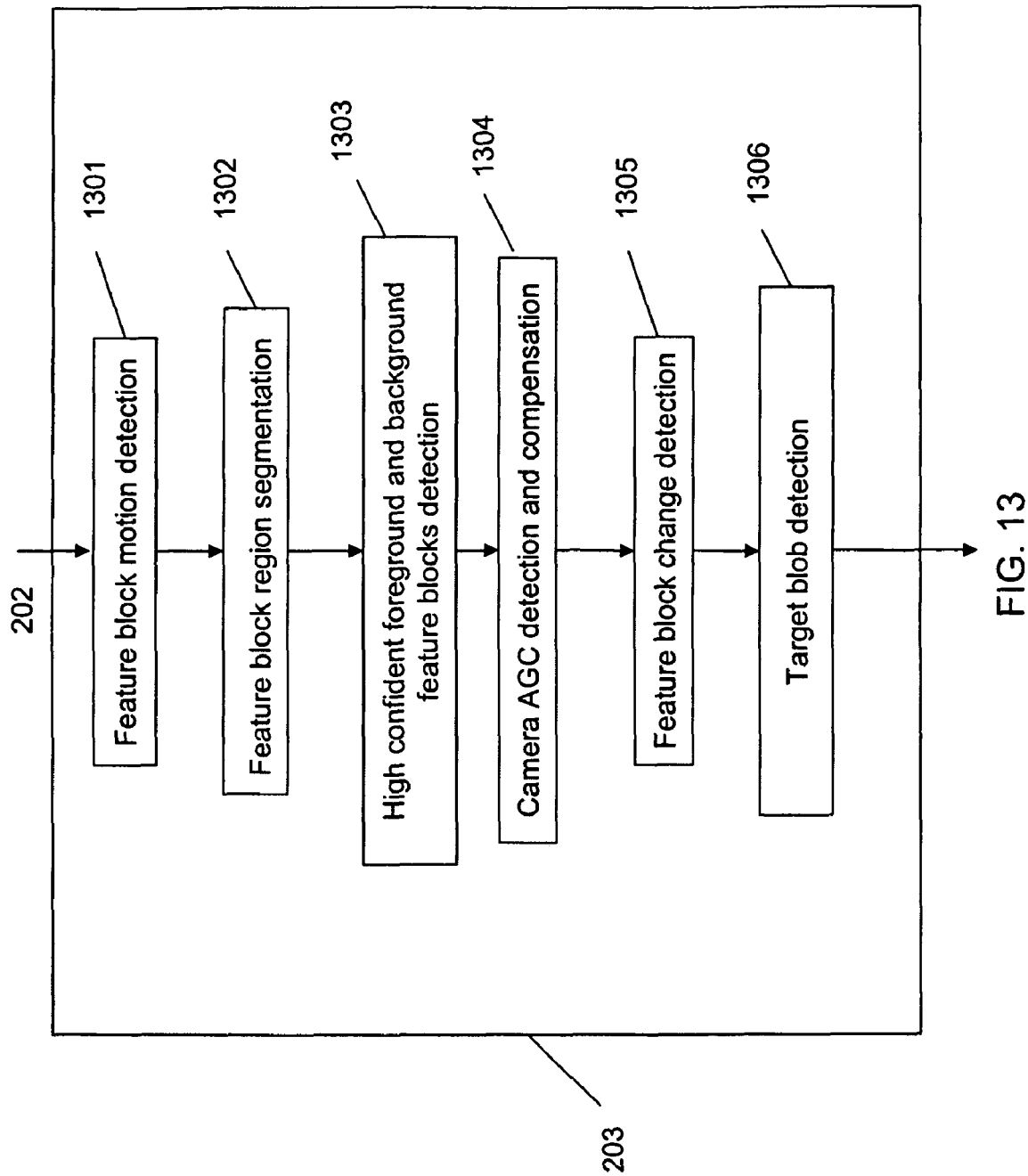
FIG. 13 depicts an exemplary conceptual block diagram of a target detection module, according to embodiments of the invention.

FIG. 13 depicts an exemplary conceptual block diagram of the target detection module 203, according to embodiments of the invention. Block 1301 may perform motion detection on the feature block map for the input frame from block 301. For each respective feature block of the reference feature block map from block 1001 and the feature block map for the input frame, the difference between the pixel intensity gradients (see FIG. 6B) and the difference between the pixel intensity means (see FIG. 6B) may be determined. From these differences, two motion masks may be generated representing strong motion area and weak motion area by, for example, standard thresholding.

Block 1302 may perform feature block region segmentation. Region detection for the feature block map for the input frame may be performed. The regions may refer to isolated non-texture feature block regions. As such, a binary region growing method may be used, and the input binary mask may be directly determined from the feature block map of the input frame.

Block 1303 may detect high-confident foreground feature blocks and high-confident background feature blocks. A high-confident foreground feature block may refer to a feature block that is predicted to be foreground with high confidence, and a high-confident background feature block may refer to a feature block that is predicted to be background with high confidence. The high-confident foreground and background feature blocks may be detected based on motion detection results from block 1301 and the difference between the input frame and the background model, which is discussed next. A feature block of the input frame may be considered to be a high-confident foreground feature block if:

(1) The pixel intensity mean or the pixel intensity gradient of the feature block for the input frame significantly differs from that of the corresponding feature block of the feature block background map of the background model; or (2) The feature block for the input frame contains motion as determined by block 1301, and the pixel intensity mean or the pixel intensity gradient of the feature block for the input frame differs from that of the corresponding feature block of the feature block background map of the background model.

A feature block may be considered to be a high-confident background feature block if:

(1) The feature block of the input frame is in a large non-texture feature block region of the input frame (see block 1302), and the pixel intensity mean of the feature block for the input frame does not noticeably differ from that of the corresponding feature block of the feature block background map of the background model; or (2) The feature block for the input frame corresponds to a stable background strong-texture feature block of the feature block background map of the background model (see FIG. 9).

Those feature blocks of the input frame that are categorized as neither a high-confident foreground feature block nor a high-confident background feature block may correspond to "gray" areas in target detection, such as, for example, the shadows of foreground targets, or noisy background such as waving trees, etc. These "gray" areas in the input frame may correspond to unreliable data, which may only be considered as supplementary data in the following blocks.

Block 1304 may perform camera AGC detection and compensation using high-confident background feature blocks. Block 1304 is discussed further below with reference to FIG. 14. Block 1305 may perform feature block change detection after the AGC is compensated in block 1304, if there is any. Similar to the feature block motion detection in block 1301, both a strong change mask and a weak change mask may be generated by comparing the feature block map of the input frame with the feature block background map of the background model using multiple difference thresholds. Block 1306 may perform target blob detection using the strong and weak motion masks from block 1301 and the strong and weak change masks from block 1305. Here, a target blob may refer to a group of pixels considered to belong to a physical target. The strong motion mask and the strong change mask may be used as "seed" pixels to form the blob. Camera calibration information and existing target tracking information may be used to determine whether neighboring blobs should be merged. The weak motion mask and the weak change mask may then be used to refine the blobs by filling the missing foreground inside and/or around the blob.

Figure 14:
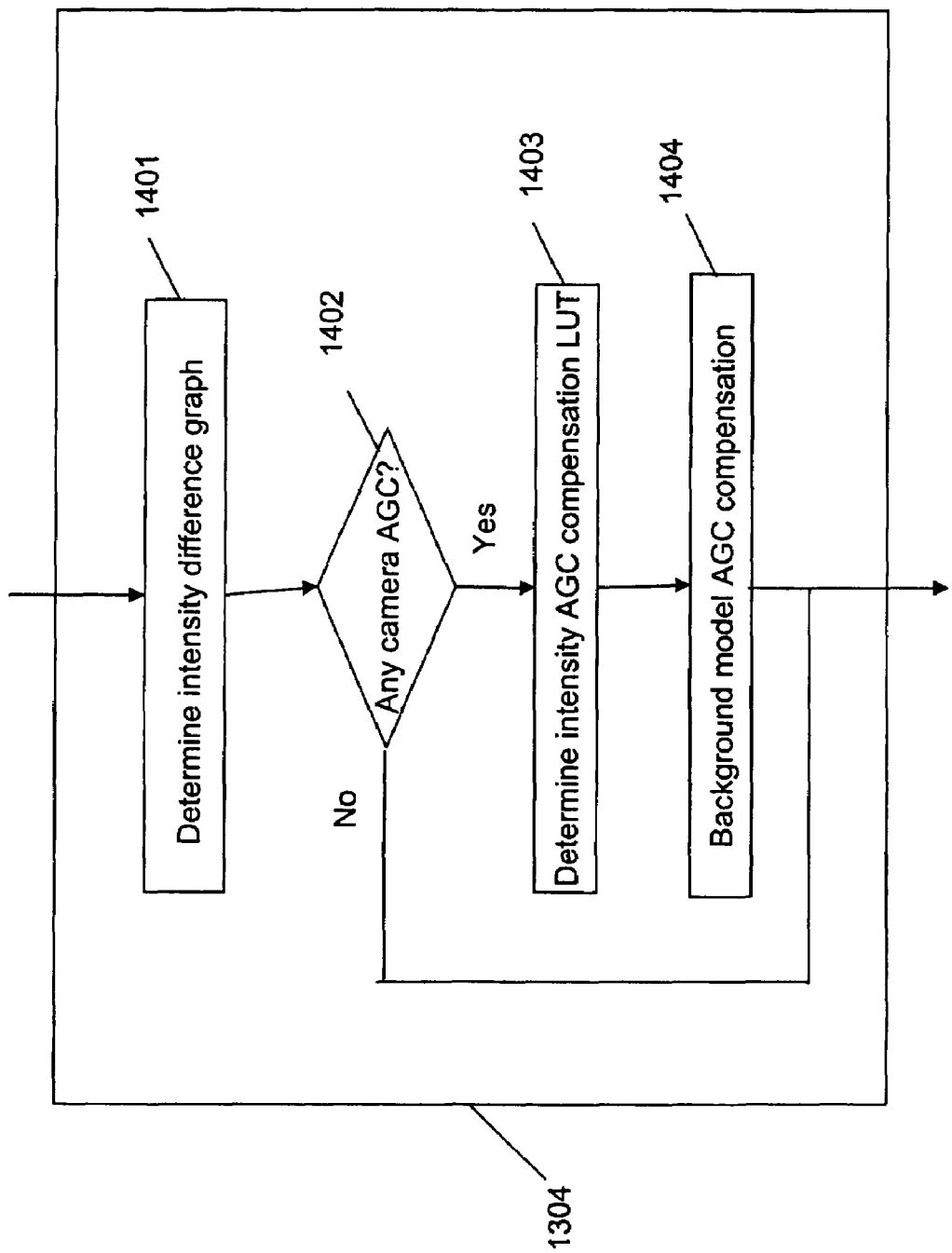
FIG. 14 depicts an exemplary conceptual block diagram of a camera AGC detection and compensation module, according to embodiments of the invention.
Figure 15B:
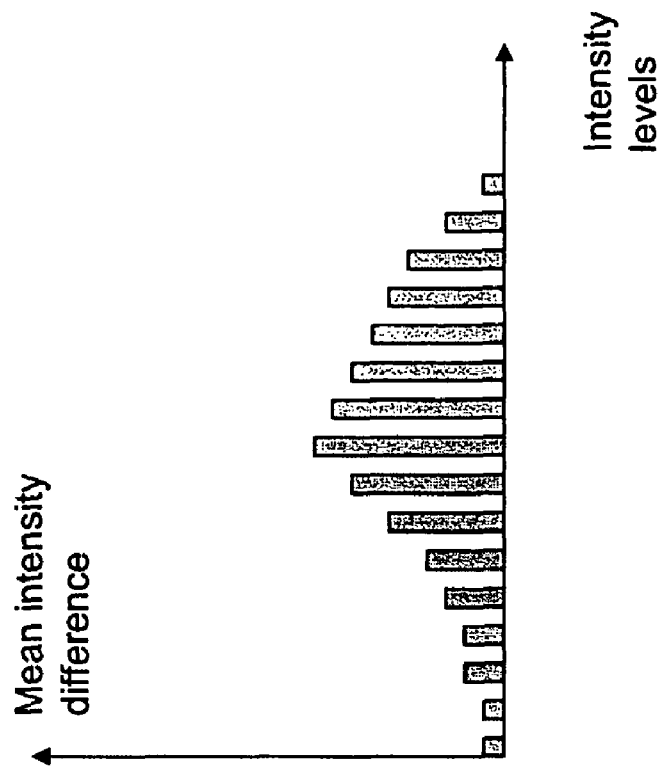
FIG. 15 shows two examples of the intensity difference mean histogram on the high confident background feature blocks using sixteen intensity bins, according to embodiments of the invention.
Figure 15A:
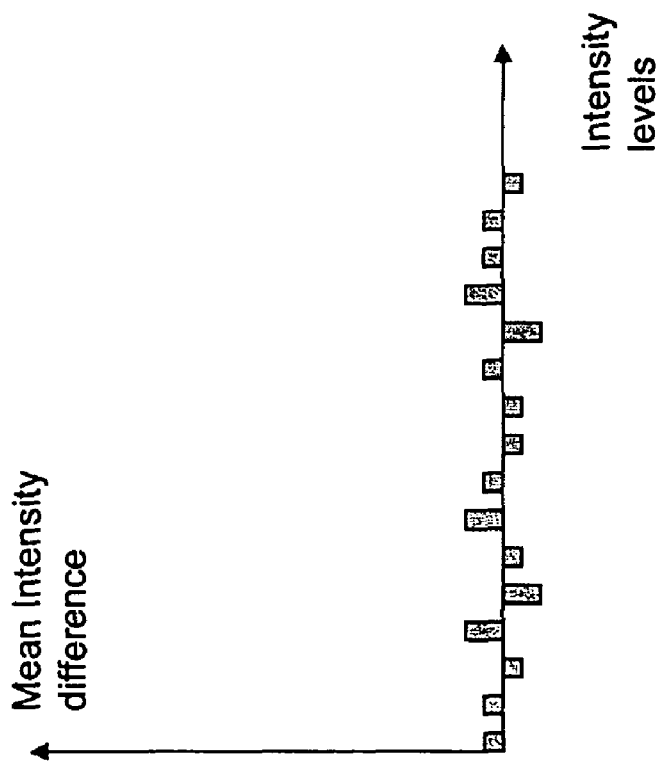

FIG. 14 depicts an exemplary conceptual block diagram for the camera AGC detection and compensation of block 1304, according to embodiments of the invention. Block 1401 may determine an intensity mean difference graph using the high-confident background feature blocks from block 1303. The pixel intensity mean (see FIG. 6B) of the high-confident background feature blocks may sub-sampled into a number of bins. For example, the pixel intensity mean may be sub-sampled so that only 16 intensity bins may be considered. Experiments have shown that this intensity resolution may be generally good enough for estimating a camera AGC response curve for 256 pixel intensities. The pixel intensity mean for the feature blocks of the background feature block map (see FIG. 9) may be similarly sub-sampled. The difference between the pixel intensity mean of each high-confident background feature block and the pixel intensity mean of the respective feature block of the background feature block map may be determined. These determined intensity differences may be added to the appropriate bin of the intensity mean difference graph. Once the intensity mean difference graph is complete, the mean $Diff_{mean}$ and the standard deviation $Diff_{std}$ of the totals for each bin in the intensity mean difference graph may be determined. FIGS. 15A and 15B show two examples of the intensity mean difference graph for the high-confident background feature blocks using 16 intensity bins. FIG. 15A illustrates a typical intensity mean difference graph when there is no camera AGC. FIG. 15B illustrates a typical intensity mean difference graph when camera AGC is observed.

Block 1402 may determine whether there is camera AGC effect for the input frame. The following three criteria may be used for detecting whether a frame has any camera AGC effect:

(1) The absolute value of the difference mean $Diff_{mean}$ may be greater than a threshold. Since the minimum resolution of the human perception on intensity change is about 4 intensity levels, a threshold of 2 may be chosen, which may be small enough to pick up the noticeable camera AGC and large enough to ignore video noise.

(2) A sufficient number of intensity bins with detected camera AGC effect may exist. An intensity bin may be considered to contain camera AGC components when the following conditions are satisfied:

$$Abs(Diff_{mean}) > 2.0, \text{ and} \quad (A)$$

$$Diff_{Std} < Min(4, Diff_{mean}), \quad (B)$$

where "Abs(x)" denotes the absolute value of x, and where "Min(x,y)" denotes the minimum of either x and y. Having a relatively small $Diff_{std}$ may be useful in removing the impact of mistakes on high-confident background feature block detection in block 1303. For example, when a foreground feature block is mistakenly detected as a high-confident background feature block and causes a high $Diff_{mean}$ value, the $Diff_{std}$ may also be very high, which may prevent the incorrectly detected feature block from being considered as a camera AGC effect.

(3) The intensity mean difference graph may have a Gaussian-shaped distribution, where the peak is in the middle and where the values are close to zero at the two extreme points. Based on experimentation, the first and the last bins may have compensation values close to zero due to intensity saturation.

If these above three criteria are satisfied, camera AGC may be determined to have occurred, and the flow may proceed to block 1403; otherwise, the flow may exit block 1304.

If these above three criteria are satisfied, block 1403 may determine an AGC compensation look-up table (LUT) for different intensity levels. The look-up table may be generated using linear interpolation based on the intensity mean difference graph as illustrated in FIG. 15B.

Block 1404 may perform AGC compensation on the background model. The pixel intensity mean (see FIG. 6B) of all the feature blocks of the background model may be adjusted using the AGC compensation look-up table produced in block 1403. This inventive technique is different from existing AGC compensation methods which usually perform the compensation on the input frames. This new method provides several significant advantages over the existing approaches. For example, first, at the detection time, no foreground region may need to be used for the AGC estimation, which may significantly reduce false detection and increase the accuracy of the AGC measurement. Second, the compensation may be performed on the background model, so there is no AGC accumulation. In other words, the actually AGC effects on the system are being reduced gradually throughout the whole AGC process. The video content analysis system may not experience a large intensity change, even when the actual AGC effect may be very severe because the background model continues to adjust itself at the same time when the AGC intensity is increasing or decreasing. Due to this reason, the camera AGC may unlikely cause false detection of targets under a normal video frame rate. Third, when compensating the background model, the intensity of the areas corresponding to existing foreground targets may also be adjusted even when the foreground targets are not seen in the current video frame. This may be a more accurate way to compensate the current foreground area because the intensity change on the foreground region may not fit into the global background AGC model.

Figure 16:
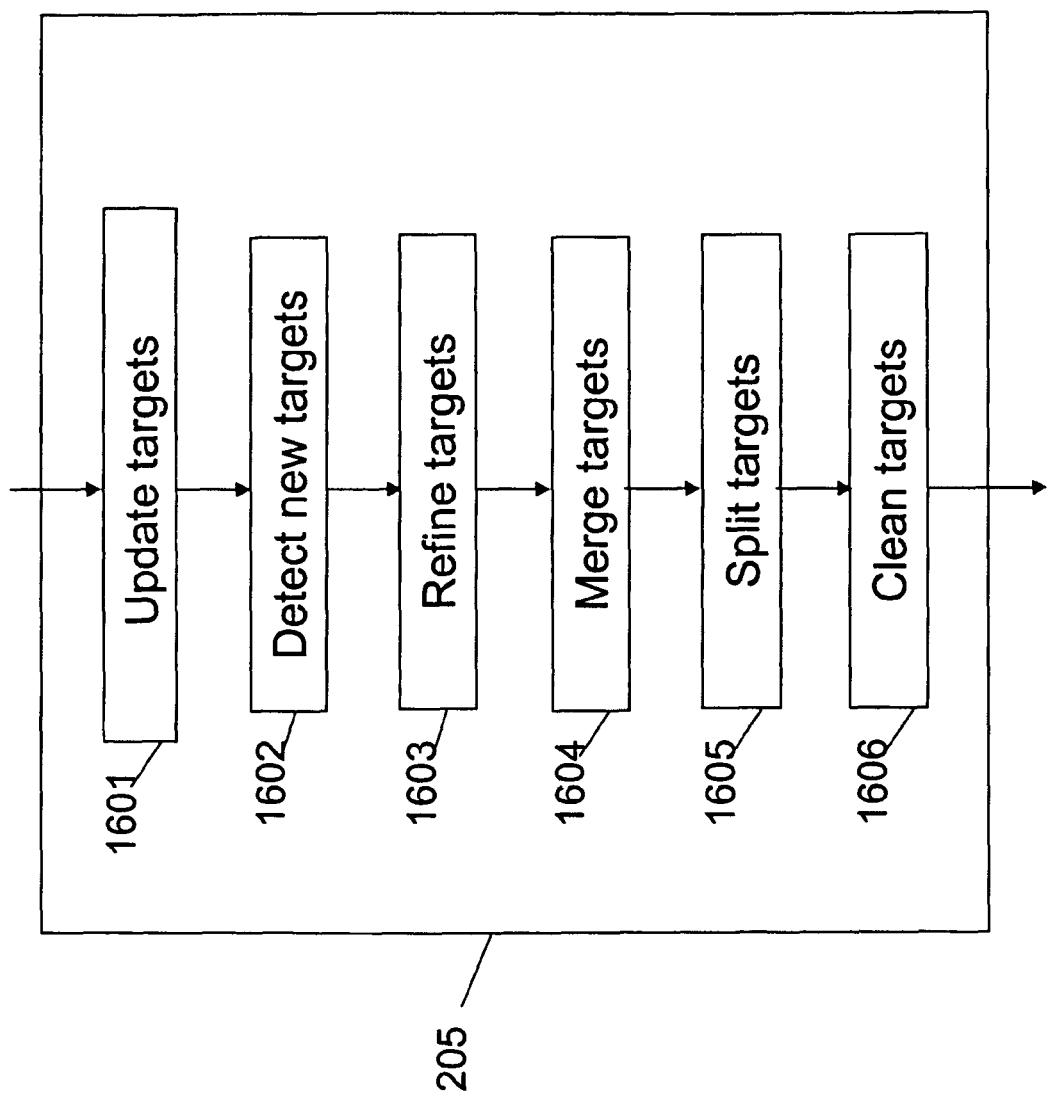
FIG. 16 depicts an exemplary conceptual block diagram of a target tracking module, according to embodiments of the invention.

FIG. 16 depicts an exemplary conceptual block diagram of the target tracking module 205, according to embodiments of the invention. In block 1601, each existing target may be updated using the target blobs detected by block 1306. In block 1602, new targets may be detected from any unassigned target blob that does that match to any existing targets in block 1601. Camera calibration information may be used here to ensure that the target blob has an appropriate size as the target of interest. For example, if the target of interest is only human, any unsigned target blobs whose size is much smaller than that of a human target at the same image location may be ignored. In block 1603, the targets may be refined to ensure that the targets keep consistent expected size. In block 1604, the targets may be analyzed to determine if the targets should be merged (i.e., two targets become one target). In block 1605, the targets may be analyzed to determine if the targets should be split (i.e., one target becomes two targets). In block 1606, the targets may be cleaned, which may be used to determine when a target has left the field of view of the video camera. An example of this approach is discussed in, for example, U.S. Published Patent Application No. 20070127774, identified above. Other techniques for target detection may be used, as will become apparent to those of ordinary skill in the art.

Figures 17A, 17B, 17C:
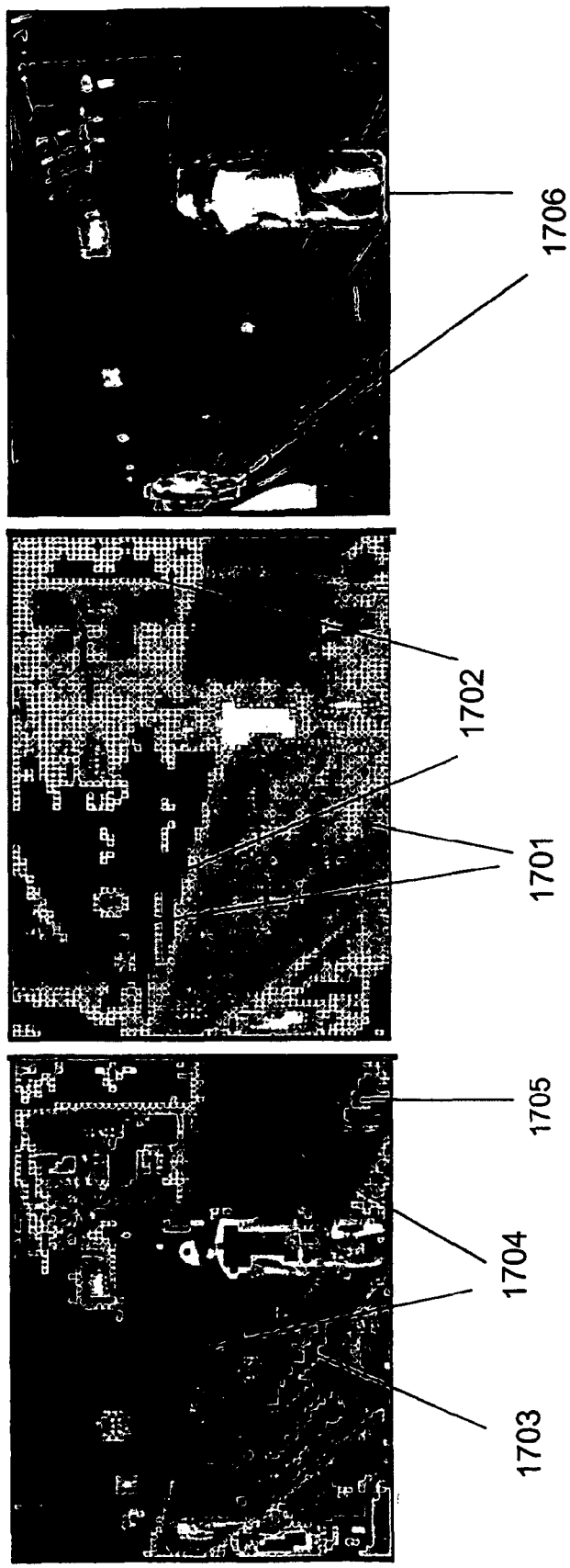
FIG. 17 illustrates some examples of the feature blocks, feature regions and detected targets, according to embodiments of the invention.

FIGS. 17A, 17B, and 17C illustrate examples of the feature blocks, feature regions and detected targets, according to embodiments of the invention. For example, FIGS. 17A and 17B depict information that may be derived from the video after processing the video with block 201. The processed video frame may include, for example: some weak-texture feature blocks 1701; some strong-texture feature blocks 1702; a texture region 1703; large non-texture regions 1704, which might be potential high-confidence background regions and be used for AGC detection; and a small non-texture region 1705. FIG. 17C depicts the same frame from the video after processing the video with block 205. The processed frame includes: some tracked targets 1706.

Figure 18:
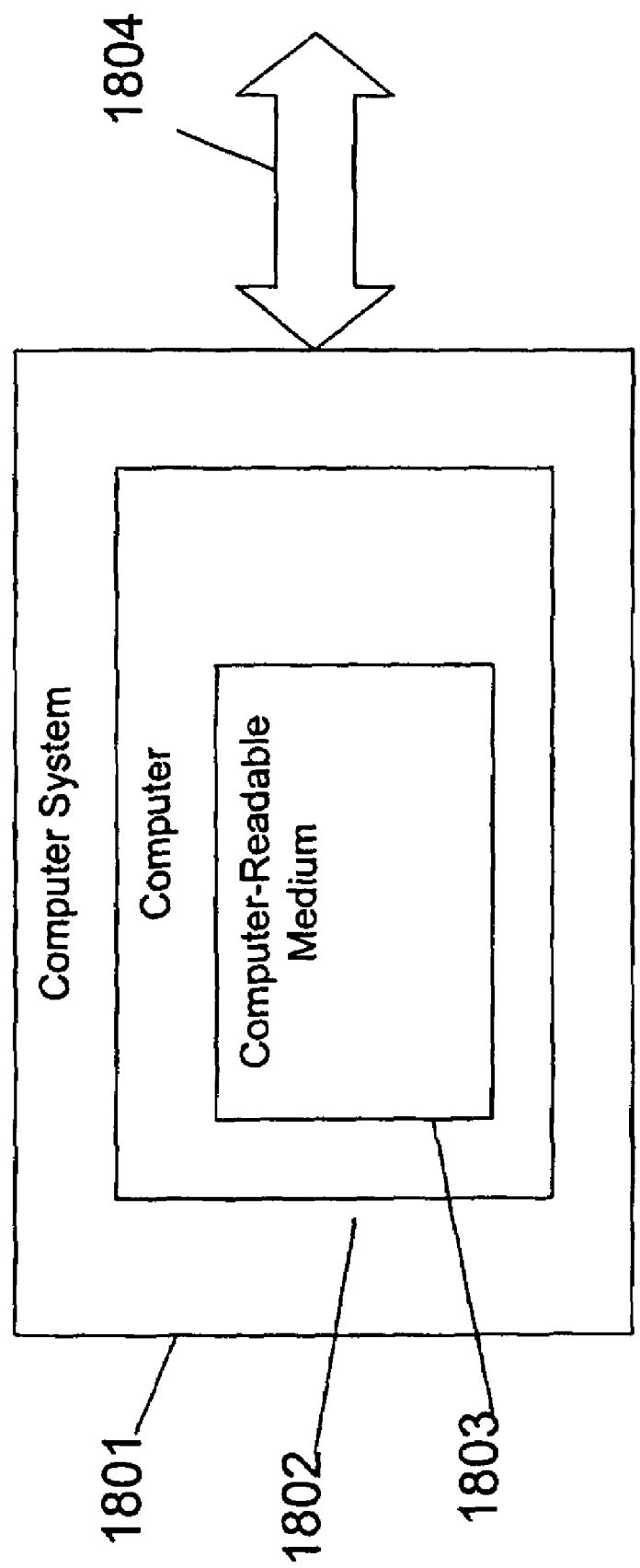
FIG. 18 depicts a computer system for use with embodiments of the invention.

FIG. 18 depicts a computer system for use with embodiments of the invention. The computer system 1801 may include a computer 1802 for implementing aspects of the exemplary embodiments described herein. For example, the computer system 1801 may implement the VCA module 102 or the entire system 100. For example, the computer 1802 may implement the VCA module 102 or the entire system 100. The computer 1802 may include a computer-readable medium 1803 embodying software for implementing the invention and/or software to operate the computer 1802 in accordance with the invention. For example, the computer-readable medium 1803 may include software having instructions to implement the various functions of the VCA module 102 as discussed herein. As an option, the computer system 1801 may include a connection to a network 1804. With this option, the computer 1802 may be able to send and receive information (e.g., software, video, data, documents) from other computer systems via the network 1804.

As another option, the video content analysis module 102, or portions of the video content analysis module 102, may be implemented as part of a video camera. In this case, the video content analysis module 102 may be implemented, for example, with application-specific hardware in the video camera or with a microprocessor having internal memory or associated memory in the video camera.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A computer-implemented method for video content analysis of a video comprising:
   modeling a background of the video, comprising:
   dividing each frame of the video into image blocks;
   determining features for each image block of each frame to obtain feature blocks for each frame;
   determining a feature block map for each frame based on the feature blocks of each frame; and
   determining a background feature block map to model the background of the video based on at least one of the feature block maps;
   detecting at least one target in a foreground of the video based on the feature blocks of the video; and
   tracking each target of the video.

2. The method of claim 1, wherein determining features for each image block of each frame to obtain feature blocks for each frame comprises:
   determining a pixel intensity for each image block;
   placing pixels in each image block into a category based on the pixel intensity;
   determining a pixel intensity gradient for each image block;
   determining pixels in the image block having a high intensity or a low intensity;
   counting a number of pixels determined to have the high intensity or low intensity; and
   determining the feature based on the pixel intensity gradient and the counting.

3. The method of claim 1, further comprising determining a best reference frame based on the feature blocks.

4. The method of claim 1, further comprising:
   determining jitter for each frame based on the reference feature block map and the feature block map of the frame; and
   adjusting each frame based on the determined jitter.

5. The method of claim 1, wherein detecting at least one target comprises:
   performing motion detection for the feature block map for each frame to obtain a first motion mask representing a string motion area and a second motion mask representing a weak motion area;
   performing feature block region segmentation;
   detecting high confident foreground feature blocks and high confident background feature blocks based on the motion detection;
   performing AGC detection and compensation based on the high confident background feature blocks;
   performing feature block change detection to obtain a first change mask representing a string change area and a second change mask representing a weak change area; and
   detecting the target using the first and a second motion masks and the first and second change masks.

6. The method of claim 5, wherein performing AGC detection and compensation based on the high confident background feature blocks comprises:
   determining an intensity difference graph;
   determining if there is any AGC effect for the frame;
   if so, generating a look up table for different intensity levels; and
   performing AGC compensation for the background model.

7. The method of claim 1, wherein the features of the feature blocks are selected from the group consisting of: pixel intensity mean, pixel intensity gradient, low intensity centroid, high intensity centroid, low intensity pixel count, high intensity pixel count, and feature block label.

8. A computer-implemented method for video content analysis of a video comprising:
   modeling a background of the video, comprising:
   dividing each frame of the video into image blocks;
   determining features for each image block of each frame to obtain feature blocks for each frame;
   determining a feature block map for each frame based on the feature blocks of each frame;
   determining a reference feature block map based on the feature blocks of frames of the video;
   determining jitter for each frame based on the reference feature block map and the feature block map of the frame; and
   adjusting each frame based on the determined jitter;
   detecting at least one target in a foreground of the video based on the feature blocks of the video; and
   tracking each target of the video.

9. The method of claim 8, wherein determining jitter comprises:
   selecting a reference feature block maps;
   selecting a weight for feature blocks in the reference feature block map;
   estimating coarse camera jitter; and
   and estimating fine camera jitter.

10. The method of claim 9, wherein estimating coarse camera jitter comprising:
    selecting horizontal and vertical strong texture feature blocks from the reference feature block map;
    generating a horizontal and vertical shift graph using the horizontal strong texture feature blocks and the vertical strong texture feature blocks; and
    estimating coarse horizontal frame shifts and coarse vertical frame shifts.

11. The method of claim 10, wherein estimating fine camera jitter comprises:
    estimating local iterative camera jitter to obtain an error surface;
    searching the error surface analysis to locate a minimum of a surface; and
    determining a jitter estimation based on the minimum of the surface.

12. The method of claim 8, wherein determining features for each image block of each frame to obtain feature blocks for each frame comprises:
  determining a pixel intensity for each image block;
  placing pixels in each image block into a category based on the pixel intensity;
  determining a pixel intensity gradient for each image block;
  determining pixels in the image block having a high intensity or a low intensity;
  counting a number of pixels determined to have the high intensity or low intensity; and
  determining the feature based on the pixel intensity gradient and the counting.

13. The method of claim 8, further comprising determining a best reference frame based on the feature blocks.

14. The method of claim 8, wherein detecting at least one target comprises:
  performing motion detection for the feature block map for each frame to obtain a first motion mask representing a string motion area and a second motion mask representing a weak motion area;
  performing feature block region segmentation;
  detecting high confident foreground feature blocks and high confident background feature blocks based on the motion detection;
  performing AGC detection and compensation based on the high confident background feature blocks;
  performing feature block change detection to obtain a first change mask representing a string change area and a second change mask representing a weak change area;
  detecting the target using the first and a second motion masks and the first and second change masks.

15. The method of claim 14, wherein performing AGC detection and compensation based on the high confident background feature blocks comprises:
  determining an intensity difference graph;
  determining if there is any AGC effect for the frame;
  if so, generating a look up table for different intensity levels; and
  performing AGC compensation for the background model.

16. A computer-implemented method for video content analysis of a video comprising:
  determining feature blocks for a video, comprising:
    dividing each frame of the video into image blocks;
    determining features for each image block of each frame to obtain feature blocks for each frame; and
    determining a feature block map for each frame based on the feature blocks of each frame;
  determining a background model of the video based on the feature block maps;
  detecting at least one target in a foreground of the video based on the feature blocks of the video, comprising
    identifying feature blocks of each frame that are likely background in the video as high-confident background feature blocks;
    determining whether each frame has a video camera automatic gain control effect based on the high-confident background feature blocks; and
    compensating for the video camera automatic gain control effect in each frame by adjusting the background model based on the high-confident background feature blocks; and
  tracking each target of the video.

* * * * *